US010033441B2

(12) United States Patent
Kawamura et al.

(10) Patent No.: US 10,033,441 B2
(45) Date of Patent: Jul. 24, 2018

(54) MOBILE TERMINAL APPARATUS, RADIO BASE STATION APPARATUS, AND RADIO COMMUNICATION METHOD

(75) Inventors: Teruo Kawamura, Yokosuka (JP); Nobuhiko Miki, Yokohama (JP); Yoshihisa Kishiyama, Yokosuka (JP)

(73) Assignee: NTT DOCOMO, INC., Tokyo (JP)

(*) Notice: Subject to any disclaimer, the term of this patent is extended or adjusted under 35 U.S.C. 154(b) by 438 days.

(21) Appl. No.: 13/378,685

(22) PCT Filed: Jun. 23, 2010

(86) PCT No.: PCT/JP2010/060612
§ 371 (c)(1),
(2), (4) Date: Feb. 9, 2012

(87) PCT Pub. No.: WO2010/150800
PCT Pub. Date: Dec. 29, 2010

(65) Prior Publication Data
US 2012/0127953 A1 May 24, 2012

(30) Foreign Application Priority Data
Jun. 23, 2009 (JP) ................. 2009-148999

(51) Int. Cl.
*H04W 4/00* (2018.01)
*H04B 7/0413* (2017.01)
(Continued)

(52) U.S. Cl.
CPC ......... *H04B 7/0413* (2013.01); *H04B 7/0639* (2013.01); *H04L 5/0023* (2013.01);
(Continued)

(58) Field of Classification Search
CPC .................................................. H04W 72/04
(Continued)

(56) References Cited

U.S. PATENT DOCUMENTS 8,072,931 B2   12/2011  Higuchi et al.
8,325,666 B2 *  12/2012  Miki et al. ............ 370/329
(Continued)

FOREIGN PATENT DOCUMENTS

CN    101405950 A    4/2009
JP    2009049539 A   3/2009
(Continued)

OTHER PUBLICATIONS

3GPP TR 25.912 V7.1.0 (Sep. 2006). evolved Universal Terrestrial Radio Access(UTRA) and Universal Terrestrial Radio Access Network(UTRAN).*
(Continued)

*Primary Examiner* — Iqbal Zaidi
(74) *Attorney, Agent, or Firm* — Osha Liang LLP

(57) ABSTRACT

To provide a radio communication method for enabling a control signal to be received with high quality and high efficiency, in the case of using spatial multiplexing transmission in data signals to transmit, and also transmitting the control signal in the same sub-frame, in the radio communication method of the invention, a mobile terminal apparatus receives a downlink signal including precoding information, separates a data signal and a control signal to assign to different radio resources, and performs MIMO-transmission on a signal of each transmission layer based on the precoding information, and a radio base station apparatus receives an uplink signal including the data signal and the control signal subjected to MIMO transmission, divides the uplink signal into data signals for each transmission layer, and reproduces the control signal from the uplink signal.

10 Claims, 21 Drawing Sheets

(51) Int. Cl.
*H04B 7/06* (2006.01)
*H04L 5/00* (2006.01)
*H04W 72/04* (2009.01)

(52) U.S. Cl.
CPC .......... *H04L 5/0044* (2013.01); *H04L 5/0053* (2013.01); *H04W 72/0413* (2013.01)

(58) Field of Classification Search
USPC ................ 370/315–327, 353–356, 331–338, 370/349–350, 390–427; 455/7, 422.1, 455/515
See application file for complete search history.

(56) References Cited

U.S. PATENT DOCUMENTS

| | | | |
|---|---|---|---|
| 9,007,988 B2* | 4/2015 | Shen | H04L 1/0026 370/322 |
| 2009/0046582 A1 | 2/2009 | Sarkar et al. | |
| 2009/0285325 A1 | 11/2009 | Zhou | |
| 2010/0195575 A1* | 8/2010 | Papasakellariou | H04W 36/385 370/328 |
| 2010/0195624 A1* | 8/2010 | Zhang | H04B 7/0413 370/335 |
| 2010/0260119 A1 | 10/2010 | Kishiyama et al. | |
| 2014/0092850 A1* | 4/2014 | Ko | H04B 7/0639 370/329 |

FOREIGN PATENT DOCUMENTS

| | | |
|---|---|---|
| WO | 2004002011 A1 | 12/2003 |
| WO | 2008062587 A1 | 5/2008 |
| WO | 2008133582 A2 | 11/2008 |
| WO | 2009023863 A1 | 2/2009 |
| WO | 2009044710 A1 | 4/2009 |

OTHER PUBLICATIONS

International Search Report w/translation from PCT/JP2010/060612 dated Aug. 17, 2010 (2 pages).
3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7)"; Sep. 2006 (57 pages).
Notification of Reasons for Rejection for Japanese Application Na 2009-148999 dated Jul. 10, 2012, with English translation thereof (4 pages).
3GPP TSG RAN WG1 Meeting #56bis, R1-091489, "UL Transmit Diversity Schemes in LTE-Advanced;" NTT DOCOMO, (Original R1-083684), Seoul, Korea, Mar. 23-27, 2009 (7 pages).
Extended European Search Report in counterpart European Patent Application No. 107921181, dated Oct. 29, 2014 (9 pages).
Office Action in counterpart Chinese Patent Application No. 201080028166.4, dated Dec. 4, 2013 (21 pages).
Office Action in counterpart Korean Patent Application No. 10-2011-7029629, dated Jul. 10, 2013 (7 pages).
Office Action in counterpart Russian Patent Application No. 2012101076/07(001488), dated Apr. 19, 2013 (9 pages).
3GPP TS 36.213 V81.0; "3rd Generation Partnership Project; Technical Specification Group Radio Access Network; Evolved Universal Terrestrial Radio Access (E-UTRA); Physical layer procedures (Release 8)" May 2009 (77 pges).
Ericsson; "Uplink non-data-associated control signaling" TSG-RAN WG1 #46bis, R1-062867; Seoul Korea; Oct. 9-13, 2006 (3 pages).
Nokia Siemens Networks, Nokia; "UL Single User MIMO Schemes in LTE-Advanced"; 3GPP TSG RAN WG1 Meeting #56, R1-090727; Athens, Greece; Feb. 9-13, 2009 (4 pages).
Office Action issued in the counterpart European Patent Application No. 10792118.1, dated Aug. 19, 2016 (6 pages).
Panasonic; "Views on UL MIMO extension up to 4x4"; 3GPP TSG RAN WG1 Meeting #56, R1-090688; Athens, Greece; Feb. 9-13, 2009 (4 pages).
Office Action issued in corresponding European Application No. 10792118.1, dated May 8, 2017 (5 pages).
Office Action issued in the counterpart Indian Patent Application No. 4987/KOLNP/2011, dated Jun. 28, 2017 (9 pages).
Nokia Siemens Networks, et al.; "UL Single User MIMO Schemes in LTE-Advanced"; 3GPP TSG RAN WG1 Meeting #56, R1-090727; Athens, Greece, Feb. 9-13, 2009 (4 pages).
Office Action issued in corresponding European Patent Application No. 10792118.1, dated Nov. 14, 2017 (7 pages).

* cited by examiner

MOBILE TERMINAL APPARATUS, RADIO BASE STATION APPARATUS, AND RADIO COMMUNICATION METHOD

TECHNICAL FIELD

The present invention relates to a mobile terminal apparatus, radio base station apparatus, and radio communication method in the next-generation mobile communication system.

BACKGROUND ART

In UMTS (Universal Mobile Telecommunications System) networks, for the purpose of improving spectral efficiency, peak data rates, etc., by adopting HSDPA (High Speed Downlink Packet Access) and HSUPA (High Speed Uplink Packet Access), it is performed exploiting maximum features of the system based on W-CDMA (Wideband Code Division Multiple Access). For the UMTS network, for the purpose of further increasing spectral efficiency and peak data rates, reducing delay and the like, Long Term Evolution (LTE) has been studied (Non-patent Document 1). In LTE, as distinct from W-CDMA, as a multiple access scheme, the scheme based on OFDMA (Orthogonal Frequency Division Multiple Access) is used in downlink, and the scheme based on SC-FDMA (Single Carrier Frequency Division Multiple Access) is used in uplink.

Signals transmitted in uplink are mapped to appropriate radio resources, and are transmitted from a mobile terminal apparatus to a radio base station apparatus. In this case, an L2/L1 control signal in uplink is transmitted with a format as shown in FIG. 1. In other words, when there is uplink data transmission, an L1/L2 control signal in uplink is transmitted using resource blocks (RBs) assigned to the Physical Uplink Shared Channel (PUSCH). In addition, the L1/L2 control signal in uplink includes quality information (CQI: Channel Quality Indicator) of downlink, downlink precoding information (PMI: Precoding Matrix Indicator), parameter (RI: Rank Indicator) for rank adaptation, transmittal confirmation information (ACK, NACK), etc.

In this case, to achieve a low Peak-to-Average Power Ratio (PARR), the L1/L2 control signal and data signal are time-multiplexed. As conceptually shown in FIG. 2, the L1/L2 control signal in the case of transmitting on the PUSCH is time-multiplexed with the data signal into a single SC-FDMA symbol. In FIG. 2, RS represents a reference signal.

Meanwhile, when there is no uplink data transmission, the L1/L2 control signal in uplink uses the Physical Uplink Control Channel (PUCCH) with a narrow band independent of the shared channel. In this case, it is possible to obtain high frequency diversity gain by inter-slot frequency hopping.

CITATION LIST

Non-Patent Literature

Non-patent Literature 1: 3GPP, TR25.912 (V7.1.0), "Feasibility study for Evolved UTRA and UTRAN", September 2006

SUMMARY OF THE INVENTION

Technical Problem

In the 3G system (W-CDMA), a fixed band of 5 MHz is substantially used, and it is possible to achieve transmission rates of approximately maximum 2 Mbps in downlink. Meanwhile, in the LTE system, using variable bands ranging from 1.4 MHz to 20 MHz, it is possible to achieve transmission rates of maximum 300 Mbps in downlink and about 75 Mbps in uplink. Further, in the UMTS network, for the purpose of further improving spectral efficiency, peak data rates, etc. successor systems to LTE have been studied (for example, LTE Advanced (LTE-A)).

In uplink in the LTE-A system, it is demanded to further improve spectral efficiency, and spectral efficiency about four times as high as the LTE system is required. To thus greatly improve spectral efficiency, it is conceivable that it becomes indispensable to apply spatial multiplexing (MIMO: Multiple-Input Multiple-Output) in uplink that is not introduced in the LTE system.

However, in the case of using spatial multiplexing transmission in data signals to transmit, and also transmitting a control signal in the same sub-frame, when the multiplexing format of the LTE system as shown in FIG. 1 is applied without any modification, the radio base station apparatus needs complicated reception processing (processing delay increases) to demodulate and decode the control signal. Meanwhile, since it is not possible to completely cancel interference by the reception processing, it is conceivable that the reception quality of the control signal deteriorates by undergoing interference from another stream. Accordingly, a radio communication method is desired for enabling a control signal to be received with high quality and high efficiency, in the case of using spatial multiplexing transmission in data signals to transmit, and also transmitting the control signal in the same sub-frame.

The present invention was made in view of such a respect, and it is an object of the invention to provide a radio communication method for enabling a control signal to be received with high quality and high efficiency, in the case of using spatial multiplexing transmission in data signals to transmit, and also transmitting the control signal in the same sub-frame.

Solution to Problem

A mobile terminal apparatus of the invention is characterized by having downlink signal receiving section configured to receive downlink signal including precoding information, assigning section configured to separate a data signal and a control signal to assign to different radio resources, and transmitting section configured to MIMO-transmit a signal of each transmission layer based on the precoding information.

A radio base station apparatus of the invention is characterized by having uplink signal receiving section configured to receive an uplink signal including a data signal and a control signal subjected to MIMO transmission, signal dividing section configured to divide the uplink signal into data signals for each transmission layer, and signal reproducing section configured to reproduce the control signal from the uplink signal.

A radio communication method of the invention is characterized by having the steps of, in a mobile terminal apparatus, receiving a downlink signal including precoding information, separating a data signal and a control signal to assign to different radio resources, and performing MIMO transmission on a signal of each transmission layer based on the precoding information, and in a radio base station apparatus, receiving an uplink signal including the data signal and the control signal subjected to the MIMO transmission, dividing the uplink signal into data signals for each transmission layer, and reproducing the control signal from the uplink signal.

Technical Advantage of the Invention

According to the invention, the mobile terminal apparatus separates a data signal and a control signal to assign to different radio resources, and therefore, in the case of using spatial multiplexing transmission in the data signal to transmit, and also transmitting the control signal in the same sub-frame, it is possible to receive the control signal with high quality and high efficiency.

DESCRIPTION OF EMBODIMENTS

Embodiments of the invention will specifically be described below with reference to accompanying drawings.
In the invention, a mobile terminal apparatus receives a downlink signal including precoding information, separates a data signal and a control signal to assign to different radio resources, and performs MIMO transmission on a signal of each transmission layer based on the precoding information, and a radio base station apparatus receives an uplink signal including the data signal and the control signal subjected to the MIMO transmission, divides the uplink signal into data signals for each transmission layer, and reproduces the control signal from the uplink signal.

As described above, in the successor system such as the LTE-A system to the LTE system, improvements are further required in spectral efficiency, and it is indispensable to apply spatial multiplexing transmission in uplink. In the case of using spatial multiplexing transmission in data signals to transmit, and also transmitting a control signal in the same sub-frame, when the multiplexing format of the LTE system is applied without any modification, it is conceivable that processing delay increases and that the reception quality of the control signal deteriorates in the radio base station apparatus.

Figure 1:
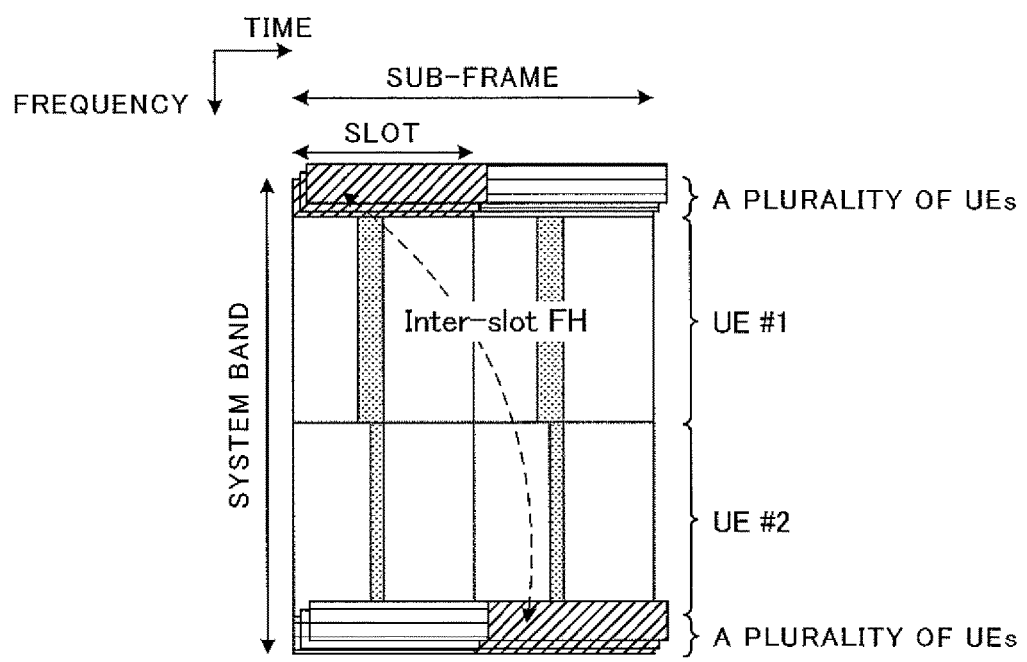
FIG. 1 is a diagram illustrating a multiplexing format of an uplink L1/L2 control signal.
Figure 2:
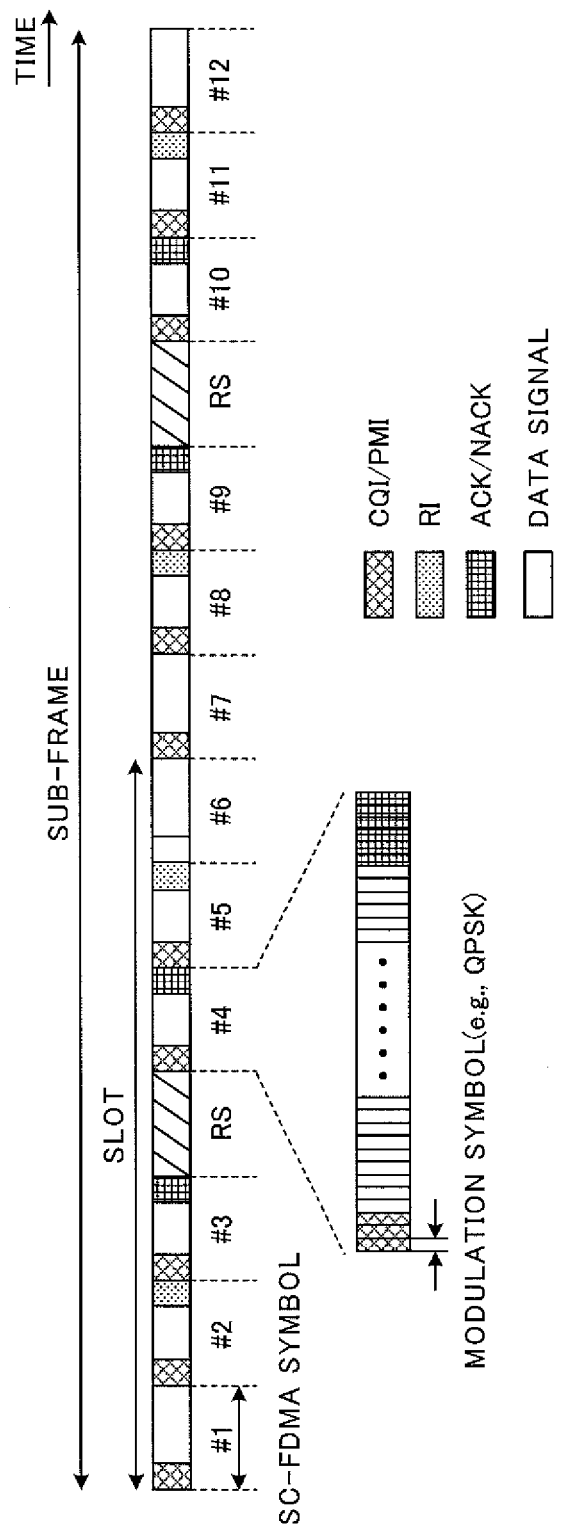
FIG. 2 is a diagram to explain multiplexing of a control signal in the PUSCH.
Figure 3:
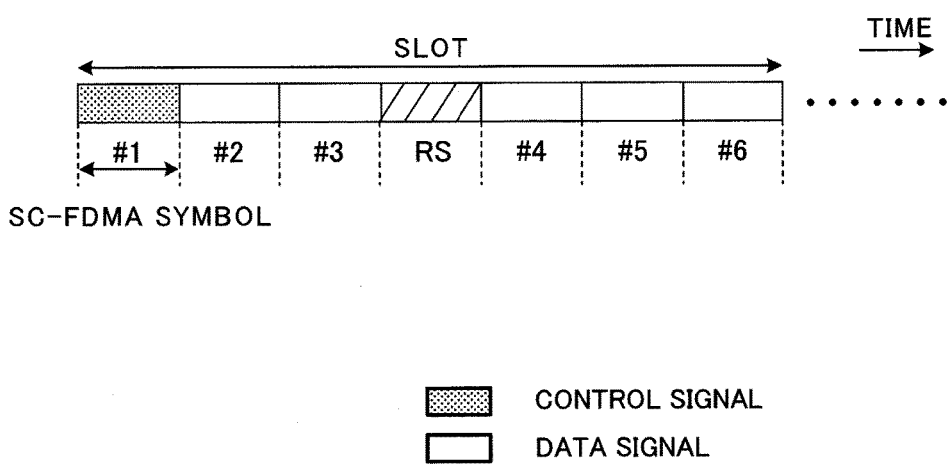
FIG. 3 is a diagram to explain multiplexing of a data signal and control signal in the time domain in the invention.

In the multiplexing format of the LTE system, as shown in FIG. 2, data signals and control signals coexist in one SC-FDMA symbol that is a unit of reception processing, and therefore, in a mobile communication environment with multi-path existing, when a control signal is demodulated, the control single undergoes the effect of interference from the data signal. The inventor of the invention noted that it is possible to cancel interference from a data signal by time-multiplexing a data signal and a control signal on an SC-FDMA symbol basis (basis of FFT processing) without the data signal and the control signal coexisting in one SC-FDMA symbol, found that it is possible to receive a control signal with high quality and high efficiency, by separating a data signal and a control signal to assign to different radio resources, in the case of using spatial multiplexing transmission in the data signal to transmit, and also transmitting the control signal in the same sub-frame, and arrived at the invention.

In other words, the gist of the invention is that a mobile terminal apparatus receives a downlink signal including precoding information, separates a data signal and a control signal to assign to different radio resources, and performs MIMO transmission on a signal of each transmission layer based on the precoding information, and that a radio base station apparatus receives an uplink signal including the data signal and the control signal subjected to the MIMO transmission, divides the uplink signal into data signals for each transmission layer, reproduces the control signal from the uplink signal, and thereby receives the control signal with high quality and high efficiency in the case of using spatial multiplexing transmission in the data signal to transmit, and also transmitting the control signal in the same sub-frame.

Embodiment 1

This Embodiment describes the case (Single-User MIMO: SU-MIMO) where a single mobile terminal apparatus performs MIMO transmission using different transmission layers in the same radio resources. In this Embodiment, a data signal and a control signal are separated and assigned to different radio resources, and thus assigned signal of each transmission layer is MIMO-transmitted. In addition, this Embodiment describes the case of two transmission layers (Layer #1, Layer #2), but the invention is not limited thereto, and is similarly applicable to the case of three or more transmission layers.

(Aspect SU1)

Figure 4:
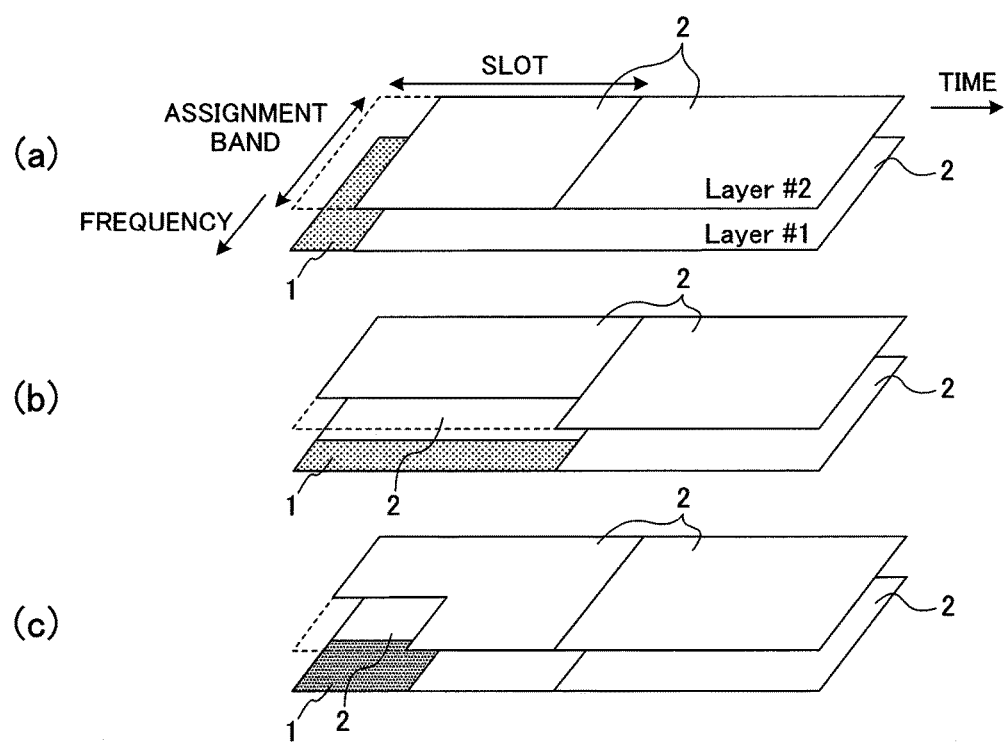
FIGS. 4(a) to 4(c) are diagrams illustrating multiplexing formats of aspect SU1 of Embodiment 1 of the invention.

FIGS. 4(a) to 4(c) are diagrams illustrating multiplexing formats of aspect SU1. In addition, in FIG. 4, RS and CP (Cyclic Prefix) are omitted (which is the same as in FIGS. 5 to 11.) In these multiplexing formats, a control signal 1 is transmitted from one slot. Further, in these multiplexing formats, in some sub-frame, the control signal 1 is transmitted from radio resources of one transmission layer.

The multiplexing format as shown in FIG. 4(a) is a format for performing Time Division Multiplex (TDM) on an SC-FDMA symbol of control signal 1 and an SC-FDMA symbol of data signal 2 in one slot. In other words, as shown in FIG. 4(a), in an assignment band, a particular SC-FDMA symbol of one slot is of control signal 1, and the other SC-FDMA symbols are of data signal 2. Further, the SC-FDMA symbol of control signal 1 is transmitted from only one transmission layer (layer #1 in FIG. 4(a)), and is not transmitted from the other transmission layer (layer #2 in FIG. 4(a)).

The multiplexing format as shown in FIG. 4(b) is a format for performing Frequency Division Multiplex (FDM) on a signal corresponding to one slot comprised of control signal 1 and a signal corresponding to one slot comprised of data signal 2. In other words, as shown in FIG. 4(b), in an assignment band, a signal of one slot where the SC-FDMA symbol is of control signal 1 is assigned to a particular frequency band, and a signal of one slot where the SC-FDMA symbol is of data signal 2 is assigned to the other frequency band. Further, the SC-FDMA symbol of control signal 1 is transmitted from only one transmission layer (layer #1 in FIG. 4(b)), and is not transmitted from the other transmission layer (layer #2 in FIG. 4(b)).

The multiplexing format as shown in FIG. 4(c) is a format for performing Time Division Multiplex on an SC-FDMA symbol of control signal 1 with an SC-FDMA symbol of data signal 2 in predetermined SC-FDMA symbols, while performing Frequency Division Multiplex (FDM/TDM Hybrid) on a signal corresponding to predetermined SC-FDMA symbols comprised of control signal 1 and predetermined SC-FDMA symbols comprised of data signal 2. In other words, as shown in FIG. 4(c), in an assignment band, a particular frequency band is assigned a signal subjected to Time Division Multiplex such that particular SC-FDMA symbols of one slot are of control signal 1 and that the other SC-FDMA symbols are of data signal 2, and the other frequency bands are assigned a signal of one slot where the SC-FDMA symbols are of data signal. Further, the SC-FDMA symbols of control signal 1 are transmitted from only one transmission layer (layer #1 in FIG. 4(c)), and are not transmitted from the other transmission layer (layer #2 in FIG. 4(c)).

In this aspect, the transmission layer for transmitting the control signal may be beforehand fixed, or switched as appropriate. In the case of switching the transmission layer for transmitting the control signal, the transmission layer may be switched in a semi-static manner, or may be switched to a layer with the highest reception quality after the radio base station apparatus measures reception quality for each layer, and transmits the measurement result to the mobile terminal apparatus as feedback. When the transmission layer is switched as appropriate, the number of the layer for transmitting the control signal is notified on the PUCCH and/or PUCCH.

(Aspect SU2)

Figure 5:
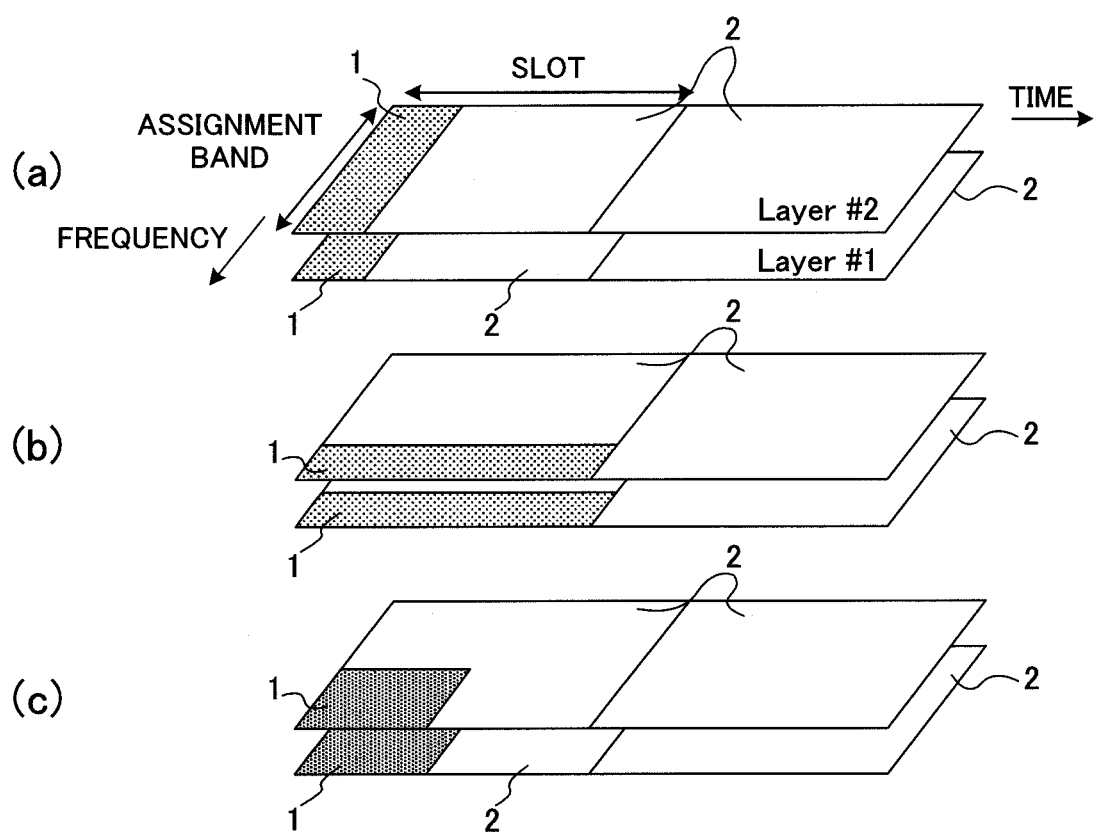
FIGS. 5(a) to 5(c) are diagrams illustrating multiplexing formats of aspect SU2 of Embodiment 1 of the invention.
Figure 6:
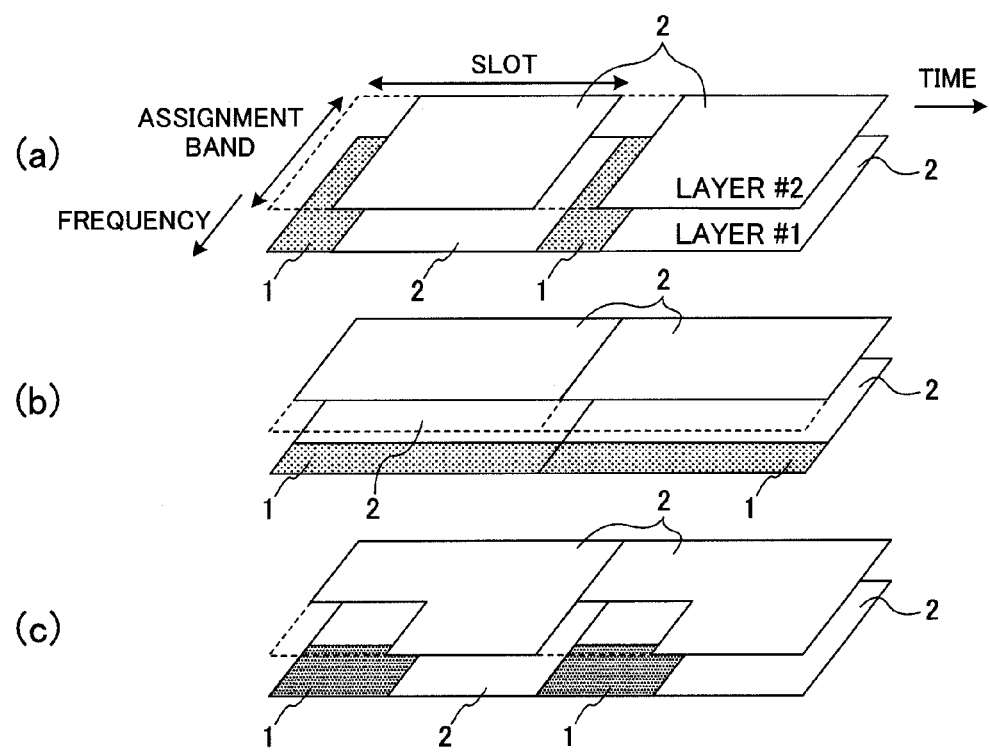
FIGS. 6(a) to 6(c) are diagrams illustrating multiplexing formats of aspect SU3 of Embodiment 1 of the invention.

FIGS. 5(a) to 5(c) are diagrams illustrating multiplexing formats of aspect SU2. In these multiplexing formats, a control signal 1 is transmitted from one slot. Further, in these multiplexing formats, the control signal 1 is transmitted with a plurality of transmission layers (layer #1, layer #2 in FIG. 5). By transmitting with the multiplexing formats, since it is possible to apply transmission diversity, the radio base station apparatus is capable of receiving the control signal 1 with high quality by diversity gain. In addition, the control 1 of layer #1 and the control signal of layer #2 are the same signal. Further, transmission diversity applied herein is not limited particularly, and may be any applicable transmission diversity.

The multiplexing format as shown in FIG. 5(a) is a format for performing Time Division Multiplex on an SC-FDMA symbol of control signal 1 and an SC-FDMA symbol of data signal 2. In other words, as shown in FIG. 5(a), in an assignment band, a particular SC-FDMA symbol of one slot is of control signal 1, and the other SC-FDMA symbols are of data signal 2. The SC-FDMA symbol of control signal 1 is transmitted from two transmission layers.

The multiplexing format as shown in FIG. 5(b) is a format for performing Frequency Division Multiplex (FDM) on a signal corresponding to one slot comprised of control signal 1 and a signal corresponding to one slot comprised of data signal 2. In other words, as shown in FIG. 5(b), in an assignment band, a signal of one slot where the SC-FDMA symbol is of control signal 1 is assigned to a particular frequency band, and a signal of one slot where the SC-FDMA symbol is of data signal 2 is assigned to the other frequency band. Further, the SC-FDMA symbol of control signal 1 is transmitted from two transmission layers.

The multiplexing format as shown in FIG. 5(c) is a format for performing Time Division Multiplex on an SC-FDMA symbol of control signal 1 with an SC-FDMA symbol of data signal 2 in predetermined SC-FDMA symbols, while performing Frequency Division Multiplex (FDM/TDM Hybrid) on a signal corresponding to predetermined SC-FDMA symbols comprised of control signal 1 and predetermined SC-FDMA symbols comprised of data signal 2. In other words, as shown in FIG. 5(c), in an assignment band, a particular frequency band is assigned a signal subjected to Time Division Multiplex such that particular SC-FDMA symbols of one slot are of control signal 1 and that the other SC-FDMA symbols are of data signal 2, and the other frequency bands are assigned a signal of one slot where the SC-FDMA symbols are of data signal. The SC-FDMA symbols of control signal 1 are transmitted from two transmission layers.

(Aspect SU3)

FIGS. 6(a) to 6(c) are diagrams illustrating multiplexing formats of aspect SU3. In these multiplexing formats, a control signal 1 is transmitted from two slots. Further, in these multiplexing formats, in some sub-frame, the control signal 1 is transmitted from radio resources of one transmission layer.

The multiplexing format as shown in FIG. 6(a) is a format for performing Time Division Multiplex (TDM) on an SC-FDMA symbol of control signal 1 and an SC-FDMA symbol of data signal 2 in each of two slots. In other words, as shown in FIG. 6(a), in an assignment band, a particular SC-FDMA symbol of each of slots is of control signal 1, and the other SC-FDMA symbols are of data signal 2. Further, the SC-FDMA symbol of control signal 1 is transmitted from only one transmission layer (layer #1 in FIG. 6(a)), and is not transmitted from the other transmission layer (layer #2 in FIG. 6(a)).

The multiplexing format as shown in FIG. 6(b) is a format for performing Frequency Division Multiplex (FDM) on a signal corresponding to two slots comprised of control signal 1 and a signal corresponding to two slots comprised of data signal 2. In other words, as shown in FIG. 6(b), in an assignment band, a signal of one slot where the SC-FDMA symbol is of control signal 1 is assigned to a particular frequency band, and a signal of two slots where the SC-FDMA symbol is of data signal 2 is assigned to the other frequency band. Further, the SC-FDMA symbol of control signal 1 is transmitted from only one transmission layer (layer #1 in FIG. 6(b)), and is not transmitted from the other transmission layer (layer #2 in FIG. 6(b)).

The multiplexing format as shown in FIG. 6(c) is a format for using predetermined SC-FDMA symbols in a particular frequency region for the control signal 1, and is a format performing Time Division Multiplex on an SC-FDMA symbol of control signal 1 with an SC-FDMA symbol of data signal 2, while performing Frequency Division Multiplex (FDM/TDM Hybrid) on a signal corresponding to predetermined SC-FDMA symbols comprised of control signal 1 and predetermined SC-FDMA symbols comprised of data signal 2. In other words, as shown in FIG. 6(c), in an assignment band, a particular frequency band is assigned a signal subjected to Time Division Multiplex such that particular SC-FDMA symbols of each slot are of control signal 1 and that the other SC-FDMA symbols are of data signal 2, and the other frequency bands are assigned a signal of two slots where the SC-FDMA symbols are of data signal 2. Further, the SC-FDMA symbols of control signal 1 are transmitted from only one transmission layer (layer #1 in FIG. 6(c)), and are not transmitted from the other transmission layer (layer #2 in FIG. 6(c)).

In this aspect, the transmission layer for transmitting the control signal may be beforehand fixed, or switched as appropriate. In the case of switching the transmission layer for transmitting the control signal, the transmission layer may be switched in a semi-static manner, or may be switched to a layer with the highest reception quality after the radio base station apparatus measures reception quality for each layer, and transmits the measurement result to the mobile terminal apparatus as feedback. When the transmission layer is switched as appropriate, the number of the layer for transmitting the control signal is notified on the PUCCH and/or PUCCH.

(Aspect SU4)

FIGS. 7(a) to 7(c) are diagrams illustrating multiplexing formats of aspect SU4. In these multiplexing formats, a radio control signal 1 is transmitted from two slots. Further, in these multiplexing formats, the transmission layer for transmitting the control signal 1 is switched for each slot.

The multiplexing format as shown in FIG. 7(a) is a format for performing Time Division Multiplex (TDM) on an SC-FDMA symbol of control signal 1 and an SC-FDMA symbol of data signal 2 in each of two slots. In other words, as shown in FIG. 7(a), in an assignment band, a particular SC-FDMA symbol of each of slots is of control signal 1, and the other SC-FDMA symbols are of data signal 2. Further, the SC-FDMA symbol of control signal 1 of a first slot is transmitted from one transmission layer (layer #1 in FIG. 7(a)), and the SC-FDMA symbol of control signal 1 of the subsequent slot is transmitted from the other transmission layer (layer #2 in FIG. 7(a)).

The multiplexing format as shown in FIG. 7(b) is a format for performing Frequency Division Multiplex (FDM) on a signal corresponding to two slots comprised of control signal 1 and a signal corresponding to two slots comprised of data signal 2. In other words, as shown in FIG. 7(b), in an assignment band, a signal of one slot where the SC-FDMA symbol is of control signal 1 is assigned to a particular frequency band, and a signal of two slots where the SC-FDMA symbol is of data signal 2 is assigned to the other frequency band. Further, the SC-FDMA symbol of control signal 1 of a first slot is transmitted from one transmission layer (layer #1 in FIG. 7(b)), and the SC-FDMA symbol of control signal 1 of the subsequent slot is transmitted from the other transmission layer (layer #2 in FIG. 7(b)).

The multiplexing format as shown in FIG. 7(c) is a format for performing Time Division Multiplex on an SC-FDMA symbol of control signal 1 with an SC-FDMA symbol of data signal 2 in predetermined SC-FDMA symbols, while performing Frequency Division Multiplex (FDM/TDM Hybrid) on a signal corresponding to predetermined SC-FDMA symbols comprised of control signal 1 and predetermined SC-FDMA symbols comprised of data signal 2. In other words, as shown in FIG. 7(c), in an assignment band, a particular frequency band is assigned a signal subjected to Time Division Multiplex such that particular SC-FDMA symbols of one slot are of control signal 1 and that the other SC-FDMA symbols are of data signal 2, and the other frequency bands are assigned a signal of two slots where the SC-FDMA symbols are of data signal. Further, the SC-FDMA symbols of control signal 1 of a first slot are transmitted from one transmission layer (layer #1 in FIG. 7(c)), and the SC-FDMA symbols of control signal 1 of the subsequent slot are transmitted from the other transmission layer (layer #2 in FIG. 7(c)).

In this aspect, the transmission layer for transmitting the control signal is used according to a beforehand determined pattern of transmission layers. This pattern may be fixed, or switched as appropriate. In the case of switching the transmission layer pattern for transmitting the control signal, the pattern may be switched in a semi-static manner. When the transmission layer pattern is switched as appropriate, the number of the layer pattern for transmitting the control signal is notified on the PUSCH and/or PUCCH.

(Aspect SU5)

Figure 8:
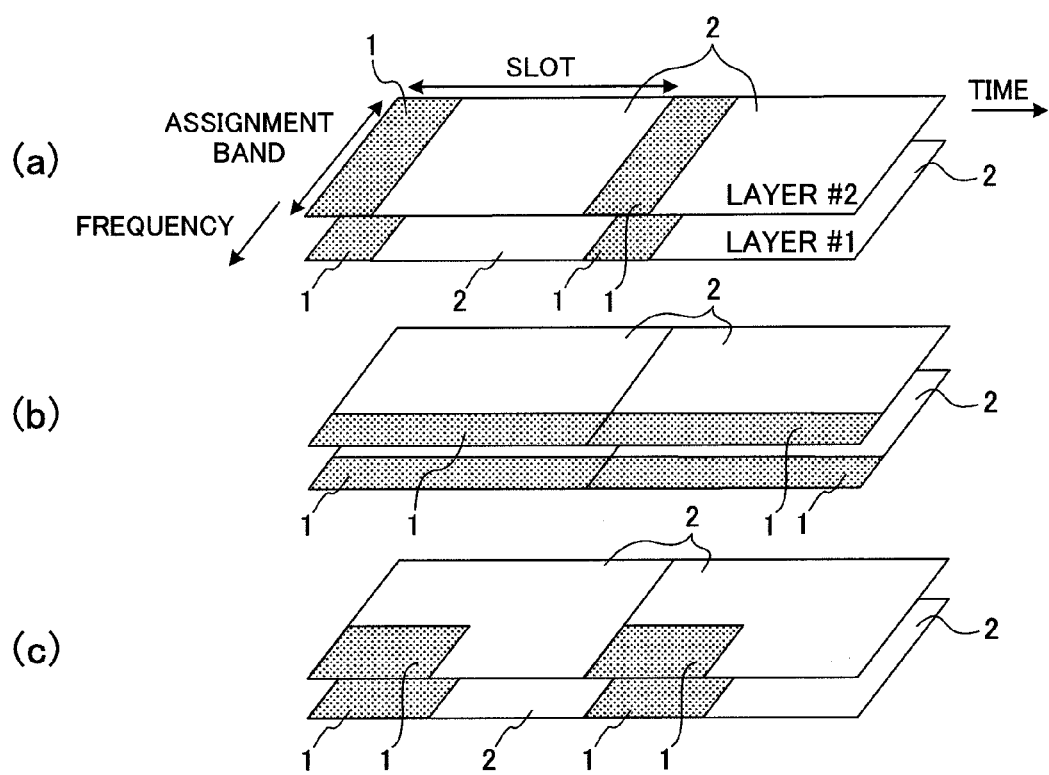
FIGS. 8(a) to (c) are diagrams illustrating multiplexing formats of aspect SU5 of Embodiment 1 of the invention.
Figure 9:
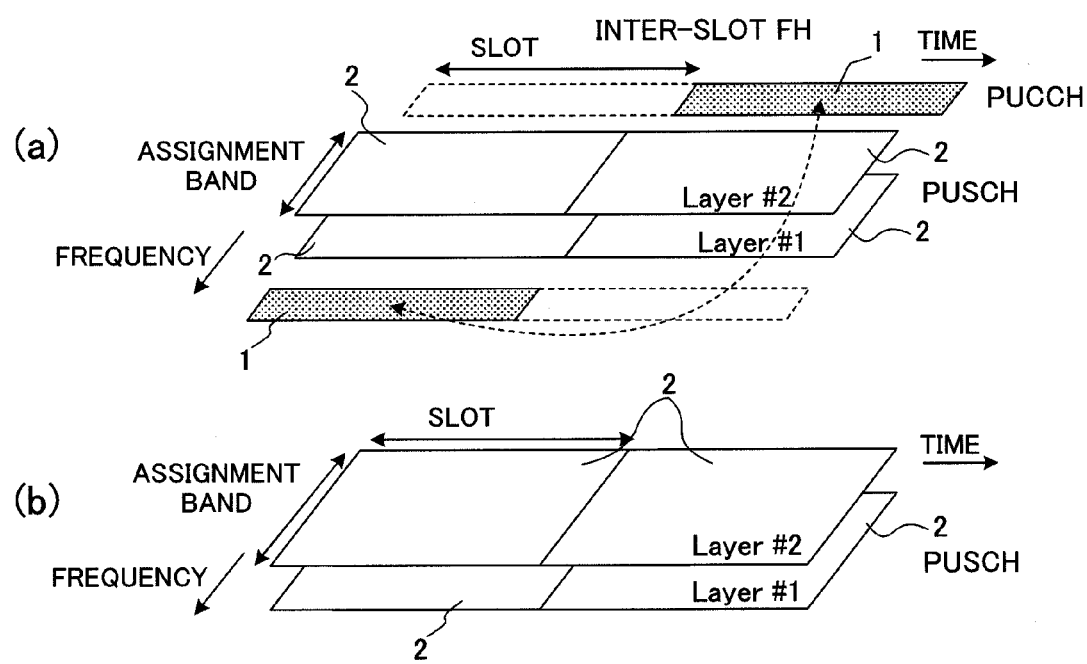
FIGS. 9(a) and 9(b) are diagrams illustrating multiplexing formats of aspect SU6 of Embodiment 1 of the invention.
Figure 10:
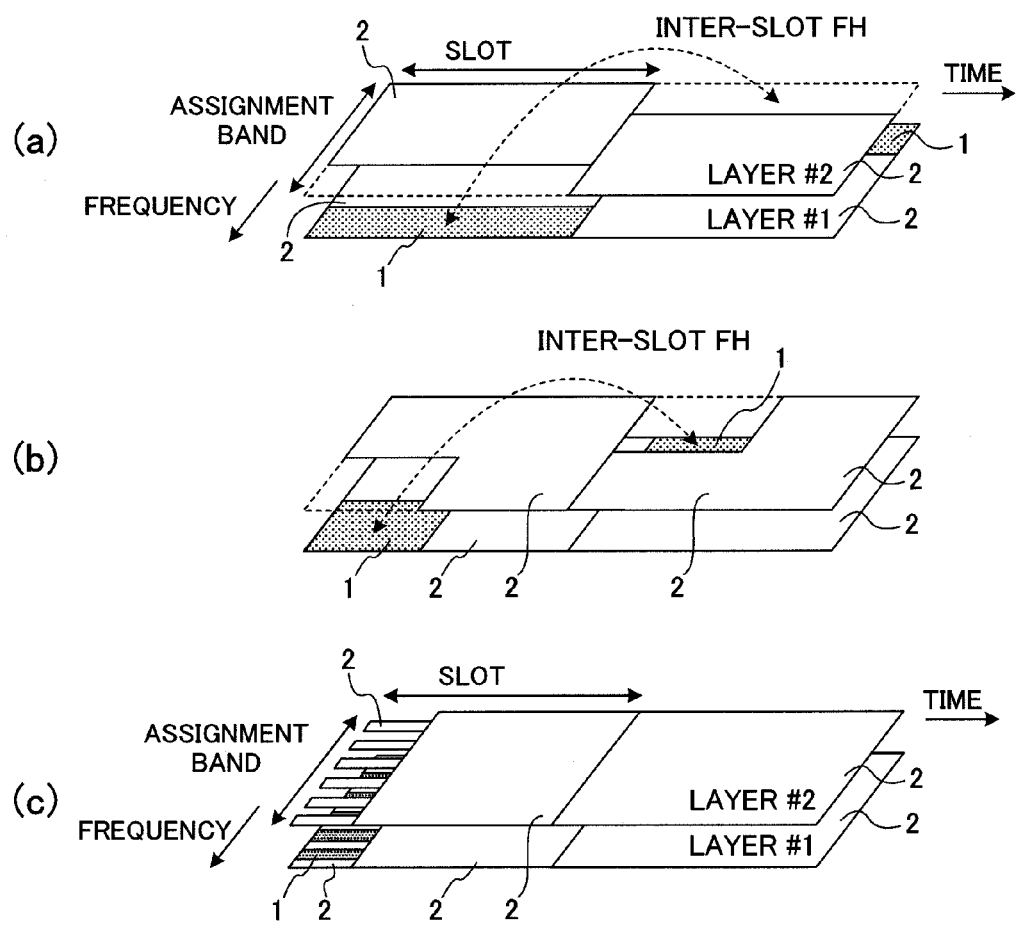
FIGS. 10(a) to 10(c) are diagrams illustrating multiplexing formats of aspect SU7 of Embodiment 1 of the invention.

FIGS. 8(a) to 8(c) are diagrams illustrating multiplexing formats of aspect SU5. In these multiplexing formats, a control signal 1 is transmitted from two slots. Further, in these multiplexing formats, the control signal 1 is transmitted with a plurality of transmission layers (layer #1, layer #2 in FIG. 8). By transmitting with the multiplexing formats, since it is possible to apply transmission diversity, the radio base station apparatus is capable of receiving the control signal 1 with high quality by diversity gain. In addition, the control signal 1 of layer #1 and the control signal of layer #2 are the same signal. Further, transmission diversity applied herein is not limited particularly, and may be any applicable transmission diversity.

The multiplexing format as shown in FIG. 8(a) is a format for performing Time Division Multiplex (TDM) on an SC-FDMA symbol of control signal 1 and an SC-FDMA symbol of data signal 2 in each slot. In other words, as shown in FIG. 8(a), in an assignment band, a particular SC-FDMA symbol of one slot is of control signal 1, and the other SC-FDMA symbols are of data signal 2. The SC-FDMA symbol of control signal 1 is transmitted from two transmission layers.

The multiplexing format as shown in FIG. 8(b) is a format for performing Frequency Division Multiplex (FDM) on a signal corresponding to two slots comprised of control signal 1 and a signal corresponding to two slots comprised of data signal 2. In other words, as shown in FIG. 8(b), in an assignment band, a signal of two slots where the SC-FDMA symbol is of control signal 1 is assigned to a particular frequency band, and a signal of two slots where the SC-FDMA symbol is of data signal 2 is assigned to the other frequency band. The SC-FDMA symbol of control signal 1 is transmitted from two transmission layers.

The multiplexing format as shown in FIG. 8(c) is a format for performing Time Division Multiplex on an SC-FDMA symbol of control signal 1 with an SC-FDMA symbol of data signal 2 in predetermined SC-FDMA symbols, while performing Frequency Division Multiplex (FDM/TDM Hybrid) on a signal corresponding to predetermined SC-FDMA symbols comprised of control signal 1 and predetermined SC-FDMA symbols comprised of data signal 2. In other words, as shown in FIG. 8(c), in an assignment band, a particular frequency band is assigned a signal subjected to Time Division Multiplex such that particular SC-FDMA symbols of each slot are of control signal 1 and that the other SC-FDMA symbols are of data signal 2, and the other frequency bands are assigned a signal of two slots where the SC-FDMA symbols are of data signal. The SC-FDMA symbols of control signal 1 are transmitted from two transmission layers.

(Aspect SU6)

FIGS. 9(a) and 9(b) are diagrams illustrating multiplexing formats of aspect SU6. In these multiplexing formats, a control signal 1 is transmitted on the PUCCH, and only a data signal 2 is transmitted on the PUSCH. In this aspect, PUSCH transmission and PUCCH transmission is performed at the same time.

In the multiplexing format as shown in FIG. 9(a), only a data signal 2 is transmitted on the PUSCH, and on the PUCCH, a control signal 1 is transmitted with different frequency bands for each slot. In this case, the control signal 1 of the PUCCH is subjected to inter-slot frequency hopping. In other words, as shown in FIG. 9(a), the data signal 2 is transmitted with two transmission layers on the PUSCH, and on the PUCCH, the control signal 1 is transmitted in different frequency regions for each slot. Further, the control signal 1 is transmitted from only one transmission layer (layer #1 in FIG. 9(a)), and is not transmitted from the other transmission layer (layer #2 in FIG. 9(a)).

In this aspect, the transmission layer for transmitting the control signal may be beforehand fixed, or switched as appropriate. In the case of switching the transmission layer for transmitting the control signal, the transmission layer may be switched in a semi-static manner, or may be switched to a layer with the highest reception quality after the radio base station apparatus measures reception quality for each layer, and transmits the measurement result to the mobile terminal apparatus as feedback. When the transmission layer is switched as appropriate, the number of the layer for transmitting the control signal is notified on the PUSCH and/or PUCCH.

In the multiplexing format as shown in FIG. 9(b), only the data signal 2 is transmitted on the PUSCH, and when MIMO transmission is performed on the PUSCH, the control signal is not transmitted on the PUCCH. In other words, when MIMO transmission is performed on the PUSCH, transmission of the control signal 1 is skipped. In this case, the mobile terminal apparatus refers to the UL scheduling grant included in the downlink control signal from the radio base station apparatus, and when the mobile terminal apparatus is instructed to transmit an uplink signal in MIMO transmission, transmits the data signal with the multiplexing format as shown in FIG. 9(b).

(Aspect SU7)

FIGS. 10(a) to 10(c) are diagrams illustrating multiplexing formats of aspect SU7. As in the above-mentioned aspect SU3, in the case of transmitting the control signal 1 from two slots, when the control signal and the data signal are multiplexed by FDM or FDM/TDM Hybrid, radio resources for transmitting the control signal may be subjected to frequency hopping between slots.

The multiplexing format as shown in FIG. 10(a) is a format for performing Frequency Division Multiplex (FDM) on a signal corresponding to one slot comprised of control signal 1 and a signal corresponding to two slots comprised of data signal 2. In other words, as shown in FIG. 10(a), in an assignment band, a particular frequency band is assigned a signal obtained by time-multiplexing a signal of one slot where SC-FDMA symbols are of control signal 1 and a signal of one slot where SC-FDMA symbols are of data signal 2, and the other frequency bands are assigned a signal of two slots where SC-FDMA symbols are of data signal 2. At this point, the frequency band to assign the control signal is changed for each slot to apply inter-slot frequency hopping. Further, the SC-FDMA symbols of control signal 1 are transmitted from only one transmission layer (layer #1 in FIG. 10(a)), and are not transmitted from the other transmission layer (layer #2 in FIG. 10(a)).

The multiplexing format as shown in FIG. 10(b) is a format for using predetermined SC-FDMA symbols in a particular frequency region for the control signal 1, and is a format for performing Time Division Multiplex on an SC-FDMA symbol of control signal 1 and an SC-FDMA symbol of data signal 2, while performing Frequency Division Multiplex (FDM/TDM Hybrid) on a signal corresponding to predetermined SC-FDMA symbols comprised of control signal 1 and predetermined SC-FDMA symbols comprised of data signal 2. In other words, as shown in FIG. 10(b), in an assignment band, a particular frequency band is assigned a signal subjected to Time Division Multiplex such that particular SC-FDMA symbols of each slot are of control signal 1 and that the other SC-FDMA symbols are of data signal 2, and the other frequency bands are assigned a signal of two slots where the SC-FDMA symbols are of data signal. At this point, the frequency band to assign the control signal is changed for each slot to apply inter-slot frequency hopping. Further, the SC-FDMA symbols of control signal 1 are transmitted from only one transmission layer (layer #1 in FIG. 10(b)), and are not transmitted from the other transmission layer (layer #2 in FIG. 10(b)).

The multiplexing format as shown in FIG. 10(c) is a format of Distributed FDM (the control signal and the data signal are multiplexed with a comp-shaped spectrum) in the case of multiplexing the control signal 1 and the data signal 2 by TDM. In other words, as shown in FIG. 10(c), with respect to a particular SC-FDMA symbol of one slot, the assignment band is divided into frequency regions in the shape of a comb, and the control signal 1 and the data signal 2 are assigned to be alternately arranged. Further, the SC-FDMA symbols of control signal 1 are transmitted from only one transmission layer (layer #1 in FIG. 10(c)), and are not transmitted from the other transmission layer (layer #2 in FIG. 10(c)). By applying such Distributed FDM, it is possible to reduce overhead of the control signal.

(Aspect SU8)

Figure 11:
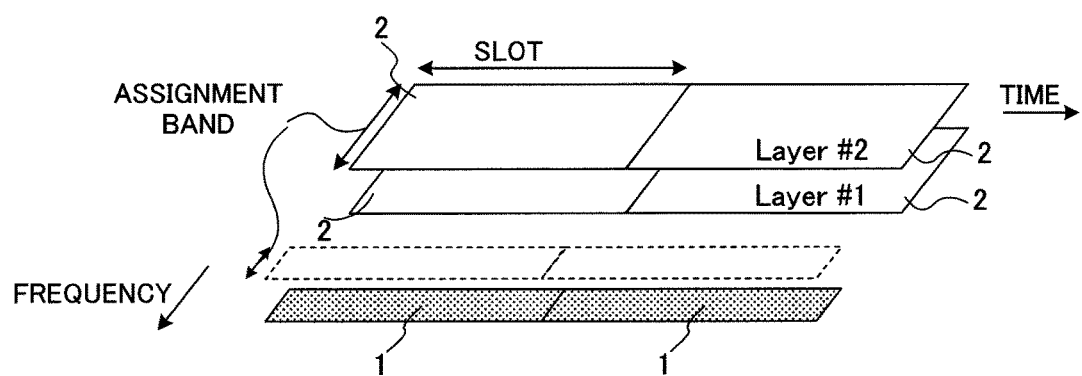
FIG. 11 is a diagram illustrating a multiplexing format of aspect SU8 of Embodiment 1 of the invention.

FIG. 11 is a diagram illustrating a multiplexing format of aspect SU8. In the case of transmitting the control signal from two slots in a sub-frame, and multiplexing the control signal 1 and the data signal 2 by FDM, the control signal 1 may use radio resources spaced (discrete) from radio resources for transmitting the data signal 2.

The multiplexing format as shown in FIG. 11 is a format for performing Frequency Division Multiplex (FDM) on a signal corresponding to two slots comprised of control signal 1 and a signal corresponding to two slots comprised of data signal 2. In other words, as shown in FIG. 11, in an assignment band, a signal of two slots where SC-FDMA symbols are of control signal 1 is assigned to a particular frequency band, and a signal of two slots where SC-FDMA symbols are of data signal 2 is assigned to another frequency band spaced from the frequency band assigned the control signal 1. Further, the SC-FDMA symbols of control signal 1 are transmitted from only one transmission layer (layer #1 in FIG. 11), and are not transmitted from the other transmission layer (layer #2 in FIG. 11). In this aspect, as in the aspect SU7, the frequency band to assign the control signal may be changed for each slot to apply inter-slot frequency hopping.

In the above-mentioned aspects SU1 to SU8, radio resources to transmit the control signal 1 are capable of being changed adaptively in consideration of the type of control signal to transmit, data size of the control signal, information of reception quality and the like.

Figure 12:
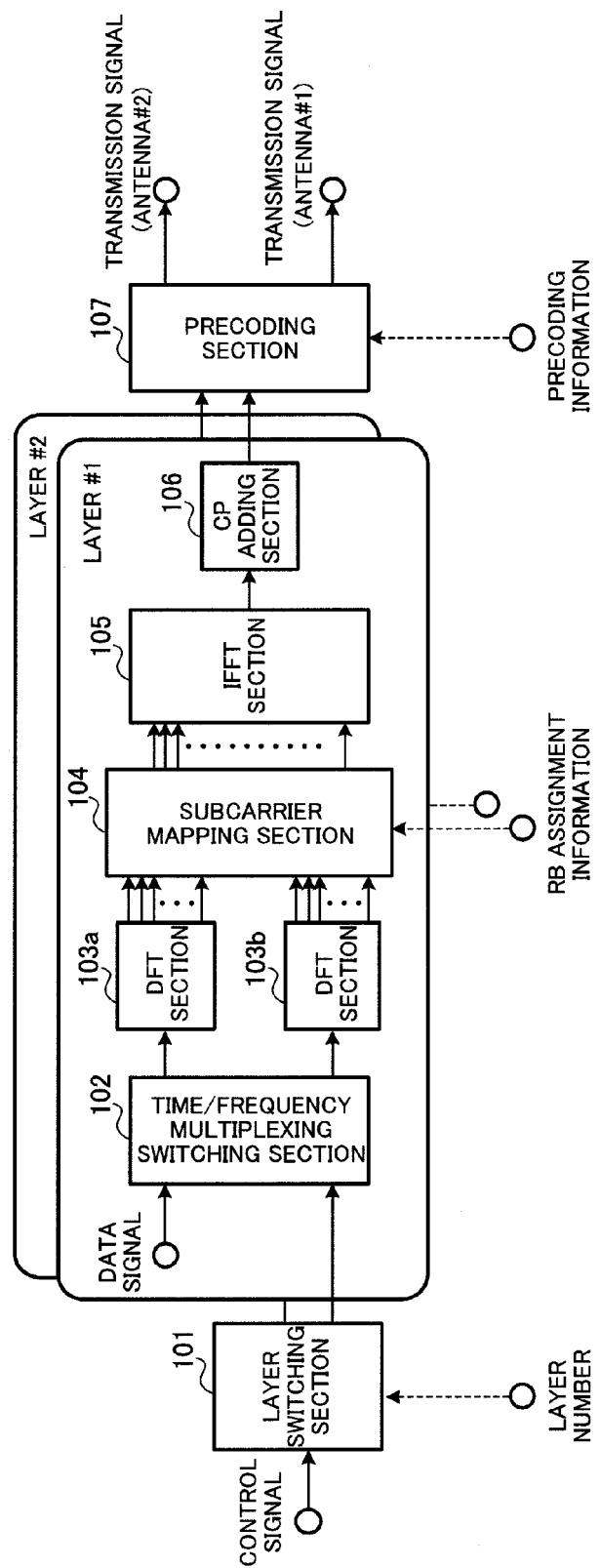
FIG. 12 is a block diagram illustrating part of a configuration of a mobile terminal apparatus according to Embodiment 1 of the invention.

FIG. 12 is a block diagram illustrating part of a configuration of the mobile terminal apparatus according to Embodiment 1 of the invention. The mobile terminal apparatus as shown in FIG. 12 is a mobile terminal apparatus capable of performing MIMO transmission, and a transmission section thereof is mainly comprised of a layer switching section 101, time/frequency multiplexing switching sections 102, Discrete Fourier Transform (DFT) sections 103a, 103b, subcarrier mapping sections 104, Inverse Fast Fourier Transform (IFFT) sections 105, CP adding sections 106, and precoding section 107. A processing section of each transmission layer has the time/frequency multiplexing switching section 102, DFT sections 103a, 103b, subcarrier mapping section 104, IFFT section 105, and CP adding section 106.

The layer switching section 101 switches the layer to transmit the control signal adaptively. In other words, the section 101 switches to output the control signal to different transmission layers. The switching between transmission layers is performed according to the layer number included in the control information notified from the radio base station apparatus. In the above-mentioned aspects SU1 and SU3, the layer switching section 102 switches to output the control signal to one transmission layer. In the above-mentioned aspect SU4, the layer switching section 101 switches to output the control signal to a different transmission layer for each slot. In the above-mentioned aspects SU2 and SU5, since transmission diversity is applied, the layer switching section 101 switches to output the control signal to all the transmission layers under transmission diversity.

The time/frequency multiplexing switching section 102 switches multiplexing schemes of the control signal and the data signal. In other words, in the case of time-multiplexing the data signal and the control signal, the time/frequency multiplexing switching section 102 outputs one of the data signal and the control signal to the DFT sections 103a, 103b, while outputting each of the data signal and the control signal to the DFT sections 103a, 103b in the case of frequency-multiplexing.

The subcarrier mapping section 104 maps signals in the frequency domain to subcarriers based on RB allocation information. In other words, in the case of frequency multiplexing, the subcarrier mapping section 104 separates the data signal and control signal subjected to DFT to assign to different radio resources. Further, as in the above-mentioned aspect SU6, the subcarrier mapping section 104 also has the function of assigning the data signal to the PUSCH, and assigning the control signal to the PUCCH. Furthermore, as in the above-mentioned aspects SU7 and SU8, the subcarrier mapping section 104 also has the assignment functions of inter-slot frequency hopping, Distributed FDMA, and the like.

The DFT sections 103a, 103b perform DFT on the data signal to transform into the signals in the frequency domain. The IFFT section 105 performs IFFT on the mapped signal to transform into the signal in the time domain. The CP adding section 106 adds a CP to the IFFT-processed signal. The precoding section 107 multiplies the signal for each transmission layer by a precoding weight based on precoding information in performing MIMO transmission (including transmission diversity), and generates a transmission signal corresponding to each antenna (antenna #1, antenna #2).

In addition, the layer number, RB allocation information and precoding information is notified from the radio base station apparatus as control information. The notification is performed by Higher Layer signaling via the PUSCH and/or L1/L2 signaling via the PUCCH.

Figure 13:
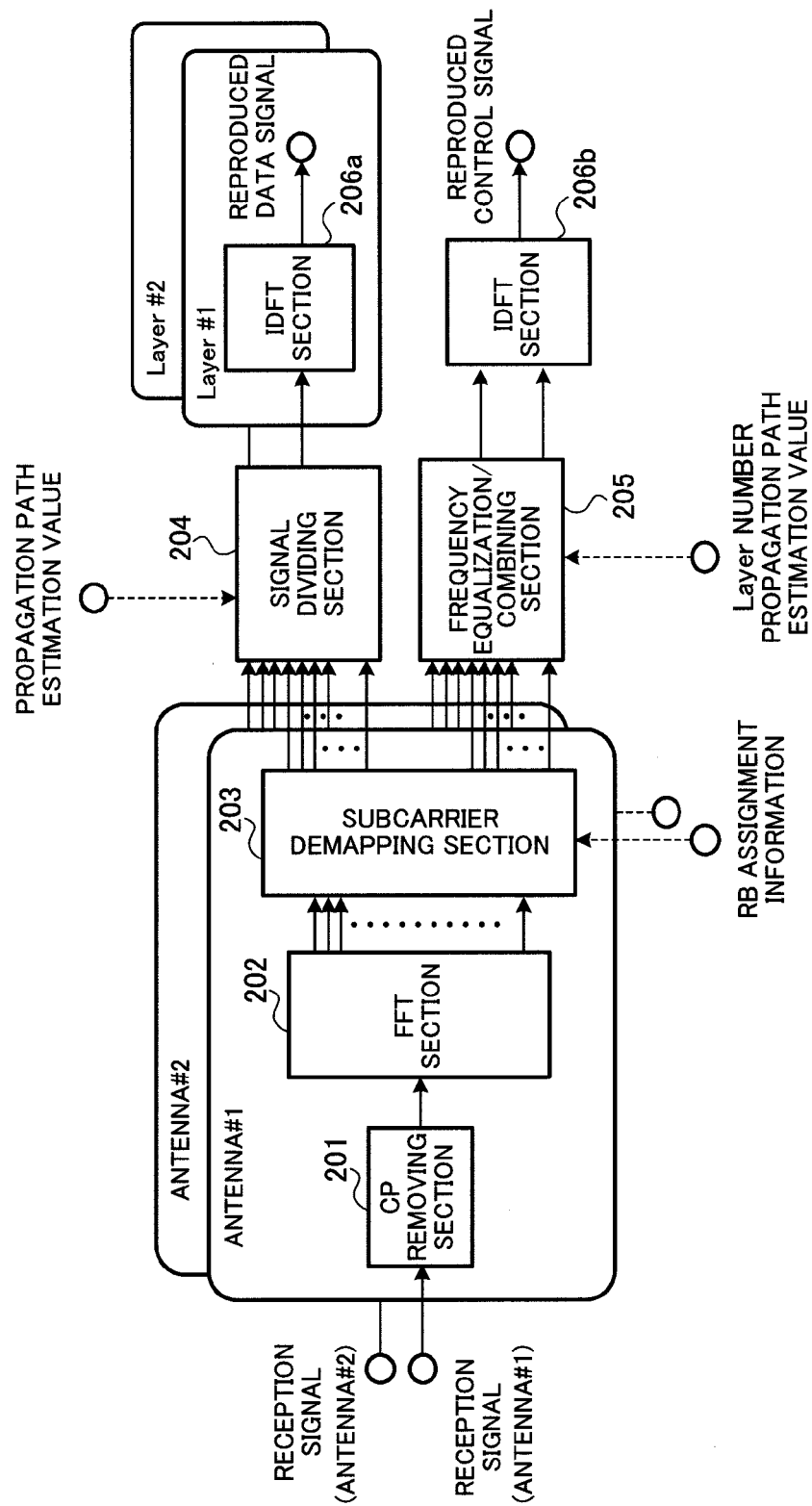
FIG. 13 is a block diagram illustrating part of a configuration of a radio base station apparatus according to Embodiment 1 of the invention.

FIG. 13 is a block diagram illustrating part of a configuration of the radio base station apparatus according to Embodiment 1 of the invention. The radio base station apparatus as shown in FIG. 13 is a radio base station apparatus capable of performing MIMO reception, and a reception section thereof is mainly comprised of CP removing sections 201, Fast Fourier Transform (FFT) sections 202, subcarrier demapping sections 203, signal dividing section 204, frequency equalization/combining section 205, and Inverse Discrete Fourier Transform (IDFT) sections 206a, 206b. A reception processing section of each antenna has the CP removing section 201, FFT section 202, and subcarrier demapping section 203, and each of processing sections for each transmission layer has the IDFT section 206a for the data signal.

The subcarrier demapping section 203 separates the control signal and the data signal (in time and/or in frequency) for each SC-FDMA symbol based on the RB allocation information. The radio base station apparatus already knows how the control signal and the data signal are multiplexed, and therefore, the processing block is capable of separating the control signal and the data signal.

The signal dividing section 204 divides the subcarrier-demapped signal into data signals for each transmission layer using propagation path estimation values. The propagation path estimation values are obtained from CQI signals extracted from the reception signal by synchronization detection/channel estimation. The data signal divided for each layer is transformed into the signal in the time domain in the IDFT section 206a of the signal processing section (Layer #1, Layer #2) for each layer, then demodulated, decoded, and is signal-reproduced as the data signal.

The frequency equalization/combining section 205 performs propagation path compensation on the control signal received for each layer using the propagation path estimation value according to the layer number. The propagation path estimation value is obtained from the CQI signal extracted from the reception signal by synchronization detection/channel estimation. The control signal subjected to propagation path compensation is transformed into the signal in the time domain in the IDFT section 206b, then demodulated, decoded, and is signal-reproduced. As in the above-mentioned aspects SU2 and SU5, when transmission diversity is applied to the control signal, the frequency equalization/combining section 205 combines the control signal. By this means, it is possible to obtain gain of transmission diversity.

The CP removing section 201 removes a portion corresponding to the CP and extracts an effective signal portion, using an estimation value of reception timing estimated from the reception signal. The FFT section 202 performs FFT on the reception signal to transform into the signals in the frequency domain. The IDFT sections 206a 206b transform the signals in the frequency domain into the signals in the time domain.

A radio communication method according to this Embodiment using the radio base station apparatus and mobile terminal apparatus with the above-mentioned configurations will be described for each aspect.

(Aspect SU1, Aspect SU3 and Aspects SU6 to SU8)

In the mobile terminal apparatus, the layer switching section 101 switches output of the control signal. In the example shown in FIG. 4, FIG. 6, FIG. 9, FIG. 10 or FIG. 11, since the control signal is transmitted with the transmission layer 1, the layer switching section 101 switches to output the control signal to the time/frequency multiplexing switching section 102 of the transmission layer 1 (Layer #1). In addition, in the case of the aspect SU6, since there is the aspect (FIG. 9(b)) in which the control signal is not transmitted when the data signal is MIMO-transmitted, in this case, the layer switching section 102 halts output of the control signal to the time/frequency multiplexing switching section 102 of the transmission layer 1.

Next, the time/frequency multiplexing switching section 102 switches the multiplexing schemes of the control signal and the data signal. In the case (TDM) of using the multiplexing formats as shown in FIGS. 4(a), 6(a) and 10(c), the section 102 switches to output only one of the data signal and the control signal to the DFT sections 103a, 103b. Meanwhile, in the case (FDM) of using the multiplexing formats as shown in FIGS. 4(b), 6(b), 9(a), 10(a) and 11, the section 102 switches to output each of the data signal and the control signal to the DFT sections 103a, 103b. Further, in the case (FDM/TDM Hybrid) of using the multiplexing formats as shown in FIGS. 4(c), 6(c) and 10(b), the section 102 switches to output only one of the data signal and the control signal to the DFT sections 103a, 103b in the portion of TDM, while switching to output each of the data signal and the control signal to the DFT sections 103a, 103b in the portion of FDM.

The data signal and control signal from the time/frequency multiplexing switching section 102 are transformed into the signals in the frequency domain in the DFT sections 103a, 103b, and the signals are mapped to the multiplexing format of one of FIGS. 4(a) to 4(c), FIGS. 6(a) to 6(c), FIG. 9(a), FIGS. 10(a) to 10(c) and FIG. 11 in the subcarrier mapping section 104. Thus mapped signals are transformed into the signal in the time domain in the IFFT section 105, and then, a CP is added to the signal in the CP adding section 106.

Meanwhile, in the processing section of the transmission layer 2 (Layer #2) that does not transmit the control signal, only the data signal is transformed into the signals in the frequency domain in the DFT section, and the signals are mapped to the multiplexing format of one of FIGS. 4(a) to 4(c), FIGS. 6(a) to 6(c), FIG. 9(a), FIGS. 10(a) to 10(c) and FIG. 11 in the subcarrier mapping section. In addition, in the case of the aspect (aspect in which the control signal is not transmitted in MIMO transmission) as shown in FIG. 9(b), in the processing sections of the transmission layer 1 and transmission layer 2, only the data signal is transformed into the signals in the frequency domain in the DFT section, and the signals are mapped to the multiplexing format of FIG. 9(b) in the subcarrier mapping section. The mapping is performed based on the RB allocation information. Thus mapped signal is transformed into the signal in the time domain in the IFFT section, and a CP is added to the signal in the CP adding section.

Each of the signal from the processing section of the transmission layer 1 and the signal from the processing section of the transmission layer 2 is multiplied by a precoding weight in the precoding section 107 based on the precoding information, and the signal is a transmission signal corresponding to each antenna, and is transmitted from each of the antennas #1 and #2 as an uplink signal (MIMO transmission).

In the radio base station apparatus, the signal processing sections for each antenna receive MIMO-transmitted signals, the CP removing section 201 removes the CP, and then, the signal is transformed into the signals in the frequency domain in the FFT section 202. The signals in the frequency domain are demapped from the multiplexing format of one of FIGS. 4(a) to 4(c), FIGS. 6(a) to 6(c), FIGS. 9(a) and 9(b), FIGS. 10(a) to 10(c) and FIG. 11 in the subcarrier demapping section 203. The demapping is performed based on the RB allocation information.

The data signal subjected to subcarrier demapping from the processing section of each antenna is divided into data signals for each transmission layer in the signal dividing section 204. The data signal divided for each layer is transformed into the signal in the time domain in the IDFT section 206a in the signal processing section for each layer, then demodulated, decoded, and is signal-reproduced as the data signal. Meanwhile, the control signal subjected to subcarrier demapping from the processing section of the antenna #1 is subjected to propagation path compensation in the frequency equalization/combining section 205 using a respective propagation path estimation value, then transformed into the signal in the time domain in the IDFT section 206a, then demodulated, decoded, and is signal-reproduced as the control signal.

(Aspect SU2 and Aspect SU5)

In the mobile terminal apparatus, the layer switching section 101 switches output of the control signal. In the example shown in FIG. 5 or FIG. 8, since the control signal is transmitted with the transmission layer 1 and transmission layer 2, the layer switching section 101 switches to output the control signal to the time/frequency multiplexing switching sections 102 of the transmission layer 1 (Layer #1) and transmission layer 2 (Layer #2).

Next, the time/frequency multiplexing switching section 102 switches the multiplexing schemes of the control signal and the data signal. In the case (TDM) of using the multiplexing formats as shown in FIGS. 5(a) and 8(a), the section 102 switches to output one of the data signal and the control signal to the DFT sections 103a, 103b. Meanwhile, in the case (FDM) of using the multiplexing formats as shown in FIGS. 5(b) and 8(b), the section 102 switches to output each of the data signal and the control signal to the DFT sections 103a, 103b. Further, in the case (FDM/TDM Hybrid) of using the multiplexing formats as shown in FIGS. 5(c) and 8(c), the section 102 switches to output only one of the data signal and the control signal to the DFT sections 103*a*, 103*b* in the portion of TDM, while switching to output each of the data signal and the control signal to the DFT sections 103*a*, 103*b* in the portion of FDM.

The data signal and control signal from the time/frequency multiplexing switching section 102 are transformed into the signals in the frequency domain in the DFT sections 103*a*, 103*b*, and the signals are mapped to the multiplexing format of one of FIGS. 5(*a*) to 5(*c*), or FIGS. 8(*a*) to 8(*c*) in the subcarrier mapping section 104. Thus mapped signals are transformed into the signal in the time domain in the IFFT section 105, and then, a CP is added to the signal in the CP adding section 106.

Each of the signal from the processing section of the transmission layer 1 and the signal from the processing section of the transmission layer 2 is multiplied by a precoding weight in the precoding section 107 based on the precoding information, and the signal is a transmission signal corresponding to each antenna, and is transmitted from each of the antennas #1 and #2 as an uplink signal (MIMO transmission).

In the radio base station apparatus, the signal processing sections for each antenna receive MIMO-transmitted signals, the CP removing section 201 removes the CP, and then, the signal is transformed into the signals in the frequency domain in the FFT section 202. The signals in the frequency domain are demapped from the multiplexing format of one of FIGS. 5(*a*) to 5(*c*) or FIGS. 8(*a*) to 8(*c*) in the subcarrier demapping section 203. The demapping is performed based on the RB allocation information.

The data signal subjected to subcarrier demapping from the processing section of each antenna is divided into data signals for each transmission layer in the signal dividing section 204. The data signal divided for each layer is transformed into the signal in the time domain in the IDFT section 206*a* in the signal processing section for each layer, then demodulated, decoded, and is signal-reproduced as the data signal. Meanwhile, the control signal subjected to subcarrier demapping from the processing section of each antenna is subjected to propagation path compensation in the frequency equalization/combining section 205 using a respective propagation path estimation value, then combined, transformed into the signal in the time domain in the IDFT section 206*a*, then demodulated, decoded, and is signal-reproduced as the control signal.

(Aspect SU4)

In the mobile terminal apparatus, the layer switching section 101 switches output of the control signal. In the example shown in FIG. 7, since the control signal is transmitted with the transmission layer 1 and transmission layer 2 that are switched for each slot, the layer switching section 101 switches to output the control signal to the time/frequency multiplexing switching sections 102 of the transmission layer 1 (Layer #1) and transmission layer 2 (Layer #2).

Figure 7:
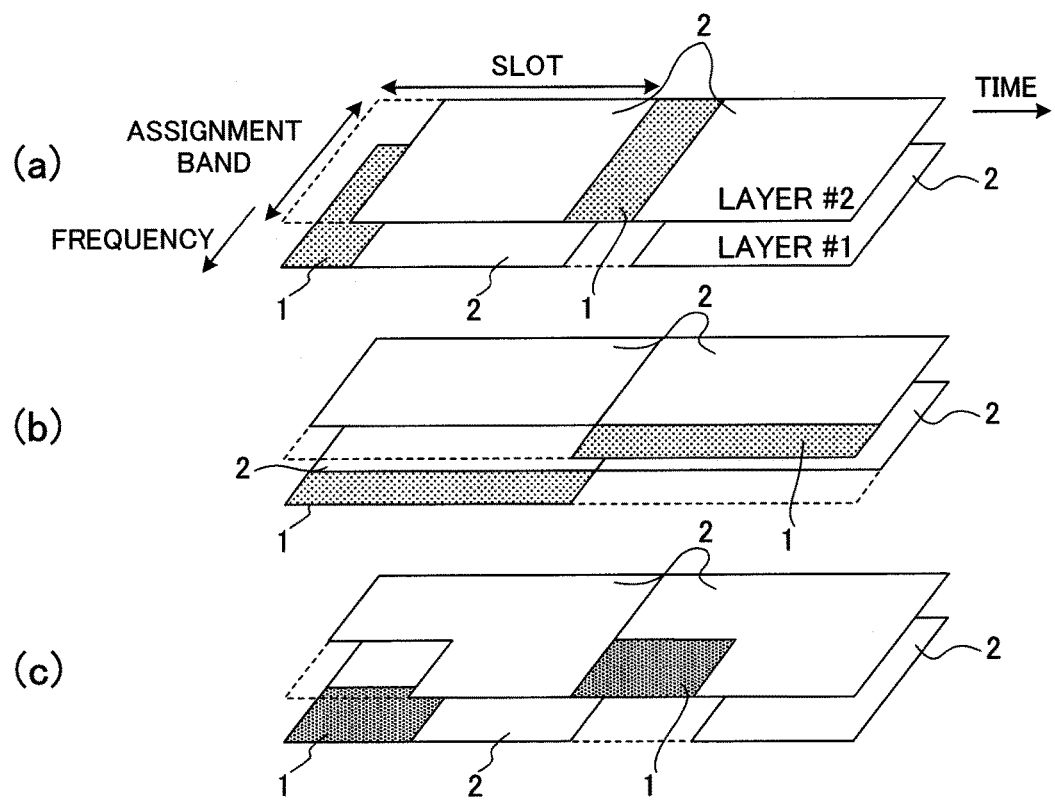
FIGS. 7(a) to 7(c) are diagrams illustrating multiplexing formats of aspect SU4 of Embodiment 1 of the invention.

Next, the time/frequency multiplexing switching section 102 switches the multiplexing schemes of the control signal and the data signal. In the case (TDM) of using the multiplexing format as shown in FIG. 7(*a*), the section 102 switches to output one of the data signal and the control signal to the DFT sections 103*a*, 103*b*. Meanwhile, in the case (FDM) of using the multiplexing format as shown in FIG. 7(*b*), the section 102 switches to output each of the data signal and the control signal to the DFT sections 103*a*, 103*b*. Further, in the case (FDM/TDM Hybrid) of using the multiplexing format as shown in FIG. 7(*c*), the section 102 switches to output only one of the data signal and the control signal to the DFT sections 103*a*, 103*b* in the portion of TDM, while switching to output each of the data signal and the control signal to the DFT sections 103*a*, 103*b* in the portion of FDM.

The data signal and control signal from the time/frequency multiplexing switching section 102 are transformed into the signals in the frequency domain in the DFT sections 103*a*, 103*b*, and the signals are mapped to the multiplexing format of one of FIGS. 7(*a*) to 7(*c*) in the subcarrier mapping section 104. Thus mapped signals are transformed into the signal in the time domain in the IFFT section 105, and then, a CP is added to the signal in the CP adding section 106.

Each of the signal from the processing section of the transmission layer 1 and the signal from the processing section of the transmission layer 2 is multiplied by a precoding weight in the precoding section 107 based on the precoding information, and the signal is a transmission signal corresponding to each antenna, and is transmitted from each of the antennas #1 and #2 as an uplink signal (MIMO transmission).

In the radio base station apparatus, the signal processing sections for each antenna receive MIMO-transmitted signals, the CP removing section 201 removes the CP, and then, the signal is transformed into the signals in the frequency domain in the FFT section 202. The signals in the frequency domain are demapped from the multiplexing format of one of FIGS. 7(*a*) to 7(*c*) in the subcarrier demapping section 203. The demapping is performed based on the RB allocation information.

The data signal subjected to subcarrier demapping from the processing section of each antenna is divided into data signals for each transmission layer in the signal dividing section 204. The data signal divided for each layer is transformed into the signal in the time domain in the IDFT section 206*a* in the signal processing section for each layer, then demodulated, decoded, and is signal-reproduced as the data signal. Meanwhile, the control signals subjected to subcarrier demapping from the processing sections of the antenna #1 and antenna #2 are subjected to propagation path compensation in the frequency equalization/combining section 205 using respective propagation path estimation values, and then, transformed into the signal in the time domain in the IDFT section 206*b*, and then, the signal is demodulated, decoded, and is signal-reproduced as the control signal.

Thus, in the radio communication method according to this Embodiment, since the data signal and the control signal are not caused to coexist in one SC-FDMA symbol, and are time-multiplexed on an SC-FDMA symbol basis (basis of performing FFT), it is possible to eliminate interference from the data signal. Therefore, by separating the data signal and the control signal to assign to different radio resources, it is possible to receive the control signal with high quality and high efficiency in the case of using spatial multiplexing transmission in the data signal to transmit, and also transmitting the control signal in the same sub-frame.

Embodiment 2

This Embodiment describes the case (Multi-User MIMO: MU-MIMO) where different mobile terminal apparatuses perform MIMO transmission using different transmission layers in the same radio resources. In this Embodiment, a data signal and a control signal are separated and assigned to different radio resources, and thus assigned signal of each transmission layer is MIMO-transmitted. In addition, this Embodiment describes the case of two transmission layers (Layer #1, Layer #2), but the invention is not limited thereto, and is similarly applicable to the case of three or more transmission layers.

(Aspect MU1)

Figure 14:
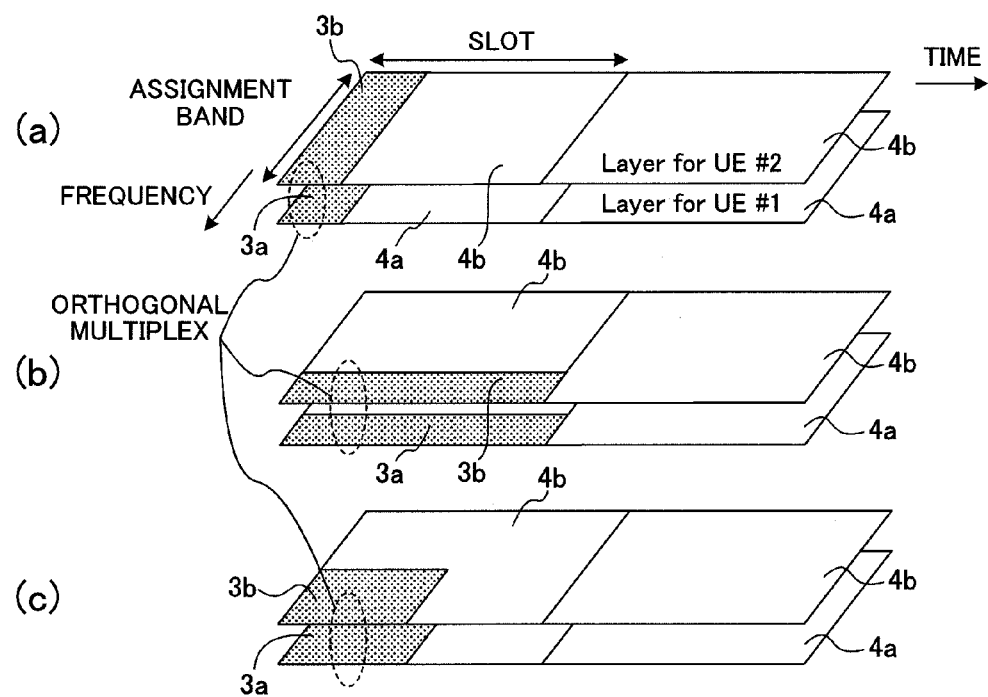
FIGS. 14(a) to 14(c) are diagrams illustrating multiplexing formats of aspect MU1 of Embodiment 2 of the invention.

FIGS. 14(a) to 14(c) are diagrams illustrating multiplexing formats of aspect MU1. In addition, in FIG. 14, RS and CP (Cyclic Prefix) are omitted (which is the same as in FIGS. 15 to 19). In these multiplexing formats, a control signal 3 is transmitted from one slot. FIG. 14 illustrates the multiplexing formats received in a radio base station apparatus, and shows that the layer of a user #1 (Layer for UE#1) and the layer of a user #2 (Layer for UE#2) are transmitted in the same radio resources.

The multiplexing format as shown in FIG. 14(a) is a format for performing Time Division Multiplex on an SC-FDMA symbol of control signal 3 and an SC-FDMA symbol of data signal 4 in one slot in the layer of each of users. In other words, as shown in FIG. 14(a), in an assignment band of the layer of the user #1, a particular SC-FDMA symbol of one slot is of control signal 3a, and the other SC-FDMA symbols are of data signal 4a. Further, in an assignment band of the layer of user #2, a particular SC-FDMA symbol of one slot is of control signal 3b, and the other SC-FDMA symbols are of data signal 4b.

The multiplexing format as shown in FIG. 14(b) is a format for performing Frequency Division Multiplex on a signal corresponding to one slot comprised of control signal 3 and a signal corresponding to one slot comprised of data signal 4. In other words, as shown in FIG. 14(b), in an assignment band of the layer of the user #1, a signal of one slot where the SC-FDMA symbol is of control signal 3a is assigned to a particular frequency band, and a signal of one slot where the SC-FDMA symbol is of data signal 4a is assigned to the other frequency band. Further, in an assignment band of the layer of the user #2, a signal of one slot where the SC-FDMA symbol is of control signal 3b is assigned to a particular frequency band, and a signal of one slot where the SC-FDMA symbol is of data signal 4b is assigned to the other frequency band.

The multiplexing format as shown in FIG. 14(c) is a format for performing Time Division Multiplex on an SC-FDMA symbol of control signal 3 with an SC-FDMA symbol of data signal 4 in predetermined SC-FDMA symbols, while performing Frequency Division Multiplex (FDM/TDM Hybrid) on a signal corresponding to predetermined SC-FDMA symbols comprised of control signal 3 and predetermined SC-FDMA symbols comprised of data signal 4, in the layer of each of the users. In other words, as shown in FIG. 14(c), in an assignment band of the layer of the user #1, a particular frequency band is assigned a signal subjected to Time Division Multiplex such that particular SC-FDMA symbols of one slot are of control signal 3a and that the other SC-FDMA symbols are of data signal 4a, and the other frequency bands are assigned a signal of one slot where the SC-FDMA symbols are of data signal 4a. Further, in an assignment band of the layer of the user #2, a particular frequency band is assigned a signal subjected to Time Division Multiplex such that particular SC-FDMA symbols of one slot are of control signal 3b and that the other SC-FDMA symbols are of data signal 4b, and the other frequency bands are assigned a signal of one slot where the SC-FDMA symbols are of data signal 4b.

In FIG. 14, the control signals 3a and 3b in the layers of respective users are mutually signals subjected to inter-user orthogonal multiplex. As the inter-user orthogonal multiplex, there are TDMA (Time Division Multiple Access) as shown in FIG. 19(a), FDMA (Frequency Division Multiple Access) (Localized FDMA and Distributed FDMA (the control signal and the data signal are multiplexed with a comb-shaped spectrum)) as shown in FIGS. 19(b) and 19(c), and/or CDMA (Code Division Multiple Access) (for example, block spreading) as shown in FIG. 19(d).

(Aspect MU2)

Figure 15:
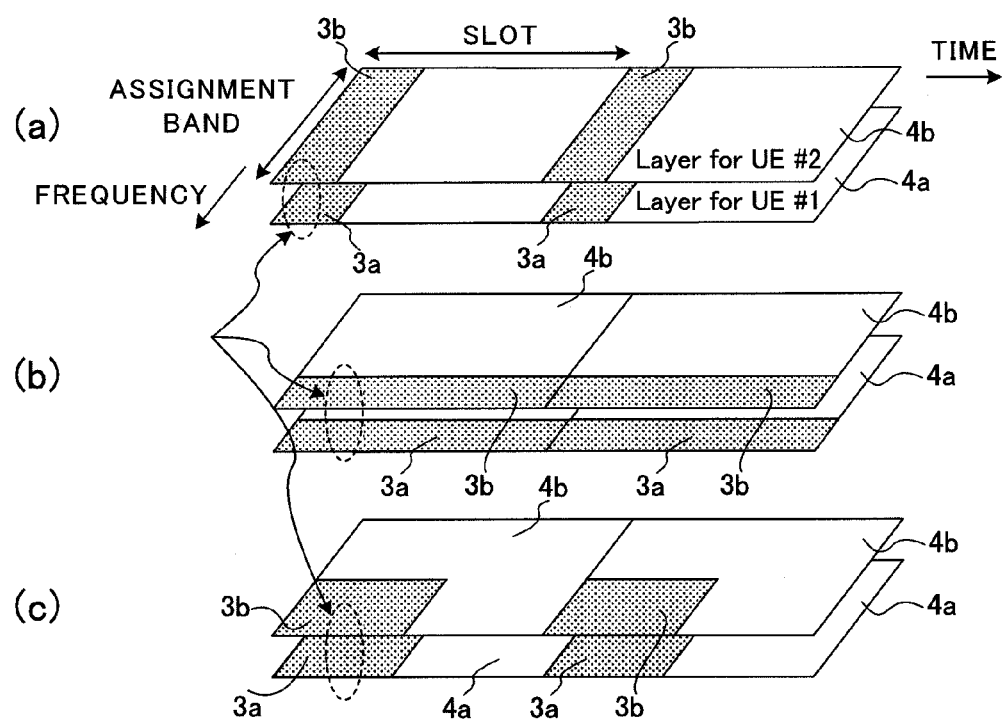
FIGS. 15(a) to 15(c) are diagrams illustrating multiplexing formats of aspect MU2 of Embodiment 2 of the invention.

FIGS. 15(a) to 15(c) are diagrams illustrating multiplexing formats of aspect MU2. In these multiplexing formats, a control signal 3 is transmitted from two slots. Further, in the multiplexing formats, a control signal 3 is transmitted. FIG. 15 illustrates the multiplexing formats received in a radio base station apparatus, and shows that the layer of a user #1 (Layer for UE#1) and the layer of a user #2 (Layer for UE#2) are transmitted in the same radio resources.

The multiplexing format as shown in FIG. 15(a) is a format for performing Time Division Multiplex on an SC-FDMA symbol of control signal 3 and an SC-FDMA symbol of data signal 4 in each slot in the layer of each of users. In other words, as shown in FIG. 15(a), in an assignment band of the layer of the user #1, a particular SC-FDMA symbol of one slot is of control signal 3a, and the other SC-FDMA symbols are of data signal 4a. Further, in an assignment band of the layer of user #2, a particular SC-FDMA symbol of one slot is of control signal 3b, and the other SC-FDMA symbols are of data signal 4b.

The multiplexing format as shown in FIG. 15(b) is a format for performing Frequency Division Multiplex on a signal corresponding to two slots comprised of control signal 3 and a signal corresponding to two slots comprised of data signal 4. In other words, as shown in FIG. 15(b), in an assignment band of the layer of the user #1, a signal of two slots where the SC-FDMA symbol is of control signal 3a is assigned to a particular frequency band, and a signal of two slots where the SC-FDMA symbol is of data signal 4a is assigned to the other frequency band. Further, in an assignment band of the layer of the user #2, a signal of two slots where the SC-FDMA symbol is of control signal 3b is assigned to a particular frequency band, and a signal of two slots where the SC-FDMA symbol is of data signal 4b is assigned to the other frequency band.

The multiplexing format as shown in FIG. 15(c) is a format for performing Time Division Multiplex on an SC-FDMA symbol of control signal 3 with an SC-FDMA symbol of data signal 4 in predetermined SC-FDMA symbols, while performing Frequency Division Multiplex (FDM/TDM Hybrid) on a signal corresponding to predetermined SC-FDMA symbols comprised of control signal 3 and predetermined SC-FDMA symbols comprised of data signal 4, in the layer of each of the users. In other words, as shown in FIG. 15(c), in an assignment band of the layer of the user #1, a particular frequency band is assigned a signal subjected to Time Division Multiplex such that particular SC-FDMA symbols of each slot are of control signal 3a and that the other SC-FDMA symbols are of data signal 4a, and the other frequency bands are assigned a signal of two slots where the SC-FDMA symbols are of data signal. Further, in an assignment band of the layer of the user #2, a particular frequency band is assigned a signal subjected to Time Division Multiplex such that particular SC-FDMA symbols of each slot are of control signal 3b and that the other SC-FDMA symbols are of data signal 4b, and the other frequency bands are assigned a signal of two slot where the SC-FDMA symbols are of data signal 4b.

In FIG. 15, the control signals 3a and 3b in the layers of respective users are mutually signals subjected to inter-user orthogonal multiplex. As the inter-user orthogonal multiplex, there are TDMA as shown in FIG. 19(a), FDMA (Localized FDMA and Distributed FDMA) as shown in FIGS. 19(b) and 19(c), and/or CDMA (for example, block spreading) as shown in FIG. 19(d).

(Aspect MU3)

Figure 16:
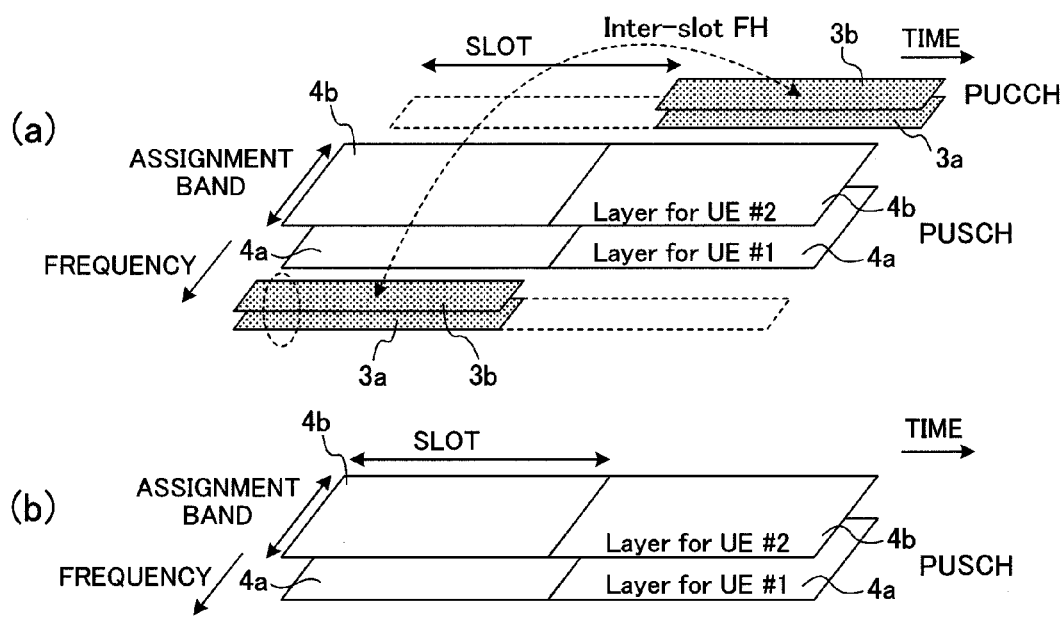
FIGS. 16(a) and 16(b) are diagrams illustrating multiplexing formats of aspect MU3 of Embodiment 2 of the invention.

FIGS. 16(a) and 16(b) are diagrams illustrating multiplexing formats of aspect MU3. In these multiplexing formats, a control signal 3 is transmitted on the PUCCH, and only a data signal 4 is transmitted on the PUSCH. In this aspect, PUSCH transmission and PUCCH transmission is performed at the same time. FIG. 16 illustrates the multiplexing formats received in a radio base station apparatus, and shows that the layer of a user #1 (Layer for UE#1) and the layer of a user #2 (Layer for UE#2) are transmitted in the same radio resources.

In the multiplexing format as shown in FIG. 16(a), only a data signal 4 is transmitted on the PUSCH, and on the PUCCH, a control signal 3 is transmitted with different bands for each slot, in the layer of each of the users. In this case, the control signal 3 of the PUCCH is subjected to inter-slot frequency hopping. In other words, as shown in FIG. 16(a), in an assignment band of the layer of the user #1, a data signal 4a is transmitted on the PUSCH, and on the PUCCH, a control signal 3a is transmitted in different frequency regions for each slot. Further, in an assignment band of the layer of the user #2, a data signal 4b is transmitted on the PUSCH, and on the PUCCH, a control signal 3b is transmitted in different frequency regions for each slot.

In the multiplexing format as shown in FIG. 16(b), only data signals 4a and 4b are transmitted on the PUSCH, and when MIMO transmission is performed on the PUSCH, the control signal is not transmitted on the PUCCH. In other words, when MIMO transmission is performed on the PUSCH, transmission of control signals 3a and 3b is skipped. In this case, the mobile terminal apparatus refers to the UL scheduling grant included in the downlink control signal from the radio base station apparatus, and when the mobile terminal apparatus is instructed to transmit an uplink signal in MIMO transmission, transmits the data signal with the multiplexing format as shown in FIG. 16(b).

In FIG. 16, the control signals 3a and 3b in the layers of respective users are mutually signals subjected to inter-user orthogonal multiplex. As the inter-user orthogonal multiplex, there are TDMA as shown in FIG. 19(a), FDMA (Localized FDMA and Distributed FDMA) as shown in FIGS. 19(b) and 19(c), and/or CDMA (for example, block spreading) as shown in FIG. 19(d).

(Aspect MU4)

Figure 17:
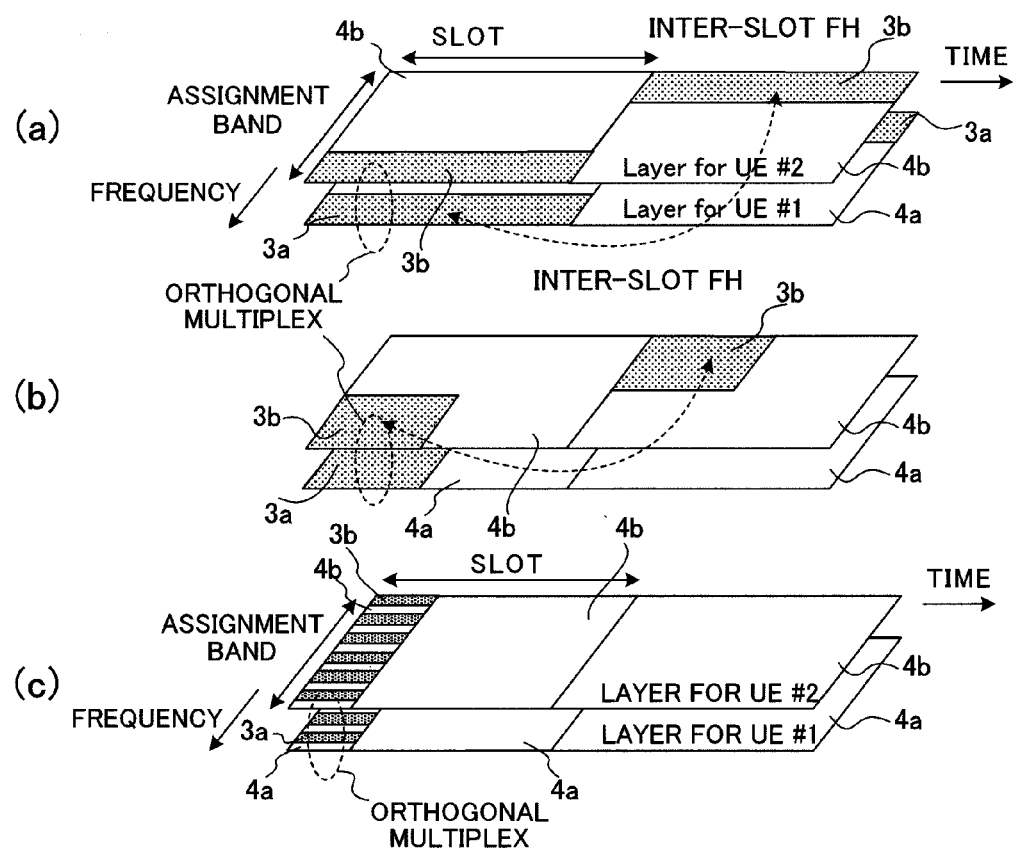
FIGS. 17(a) to 17(c) are diagrams illustrating multiplexing formats of aspect MU4 of Embodiment 2 of the invention.

FIGS. 17(a) to 17(c) are diagrams illustrating multiplexing formats of aspect MU4. As in the above-mentioned aspect MU2, in the case of transmitting the control signal 3 from two slots, when the control signal and the data signal are multiplexed by FDM or FDM/TEM Hybrid, radio resources for transmitting the control signal may be subjected to frequency hopping between slots. FIG. 17 illustrates the multiplexing formats received in a radio base station apparatus, and shows that the layer of a user #1 (Layer for UE#1) and the layer of a user #2 (Layer for UE#2) are transmitted in the same radio resources.

The multiplexing format as shown in FIG. 17(a) is a format for performing Frequency Division Multiplex on a signal corresponding to one slot comprised of control signal 3 and a signal corresponding to two slots comprised of data signal 4. In other words, as shown in FIG. 17(a), in an assignment band of the layer of the user #1, a particular frequency band is assigned a signal obtained by time-multiplexing a signal of one slot where SC-FDMA symbols are of control signal 3a and a signal of one slot where SC-FDMA symbols are of data signal 4a, and the other frequency bands are assigned a signal of two slots where SC-FDMA symbols are of data signal 4a. Further, in an assignment band of the layer of the user #2, a particular frequency band is assigned a signal obtained by time-multiplexing a signal of one slot where SC-FDMA symbols are of control signal 3b and a signal of one slot where SC-FDMA symbols are of data signal 4b, and the other frequency bands are assigned a signal of two slots where SC-FDMA symbols are of data signal 4b. At this point, the frequency band to assign the control signal is changed for each slot to apply inter-slot frequency hopping.

The multiplexing format as shown in FIG. 17(b) is a format for using predetermined SC-FDMA symbols in a particular frequency region for the control signal 3, and is a format for performing Time Division Multiplex on an SC-FDMA symbol of control signal 3 with an SC-FDMA symbol of data signal 4, while performing Frequency Division Multiplex (FDM/TDM Hybrid) on a signal corresponding to predetermined SC-FDMA symbols comprised of control signal 3 and predetermined SC-FDMA symbols comprised of data signal 4. In other words, as shown in FIG. 17(b), in an assignment band of the layer of the user #1, a particular frequency band is assigned a signal subjected to Time Division Multiplex such that particular SC-FDMA symbols of each slot are of control signal 3a and that the other SC-FDMA symbols are of data signal 4a, and the other frequency bands are assigned a signal of two slots where SC-FDMA symbols are of data signal. In an assignment band of the layer of the user #2, a particular frequency band is assigned a signal subjected to Time Division Multiplex such that particular SC-FDMA symbols of each slot are of control signal 3b and that the other SC-FDMA symbols are of data signal 4b, and the other frequency bands are assigned a signal of two slots where SC-FDMA symbols are of data signal. At this point, the frequency band to assign the control signal is changed for each slot to apply inter-slot frequency hopping.

The multiplexing format as shown in FIG. 17(c) is a format of Distributed FDM in the case of multiplexing the control signal 3 and the data signal 4 by TDM. In other words, as shown in FIG. 17(c), with respect to a particular symbol of one slot, the assignment band of the layer of the user #1 is divided into frequency regions in the shape of a comb, and the control signal 3a and the data signal 4a are assigned to be alternately arranged. Further, the assignment band of the layer of the user #2 is divided into frequency regions in the shape of a comb, and the control signal 3b and the data signal 4b are assigned to be alternately arranged.

In FIG. 17, the control signals 3a and 3b in the layers of respective users are mutually signals subjected to inter-user orthogonal multiplex. As the inter-user orthogonal multiplex, there are TDMA as shown in FIG. 19(a), FDMA (Localized FDMA and Distributed FDMA) as shown in FIGS. 19(b) and 19(c), and/or CDMA (for example, block spreading) as shown in FIG. 19(d).

(Aspect MU5)

Figure 18:
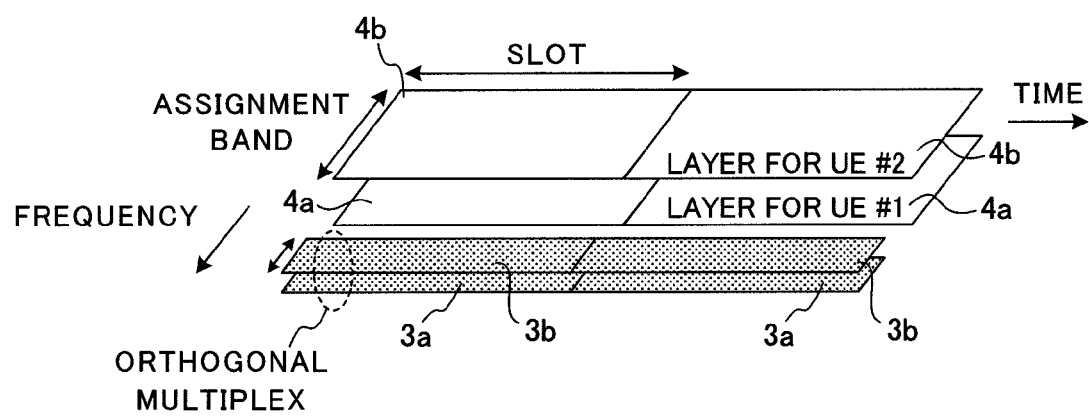
FIG. 18 is a diagram illustrating a multiplexing format of aspect MU5 of Embodiment 2 of the invention.
Figure 19:
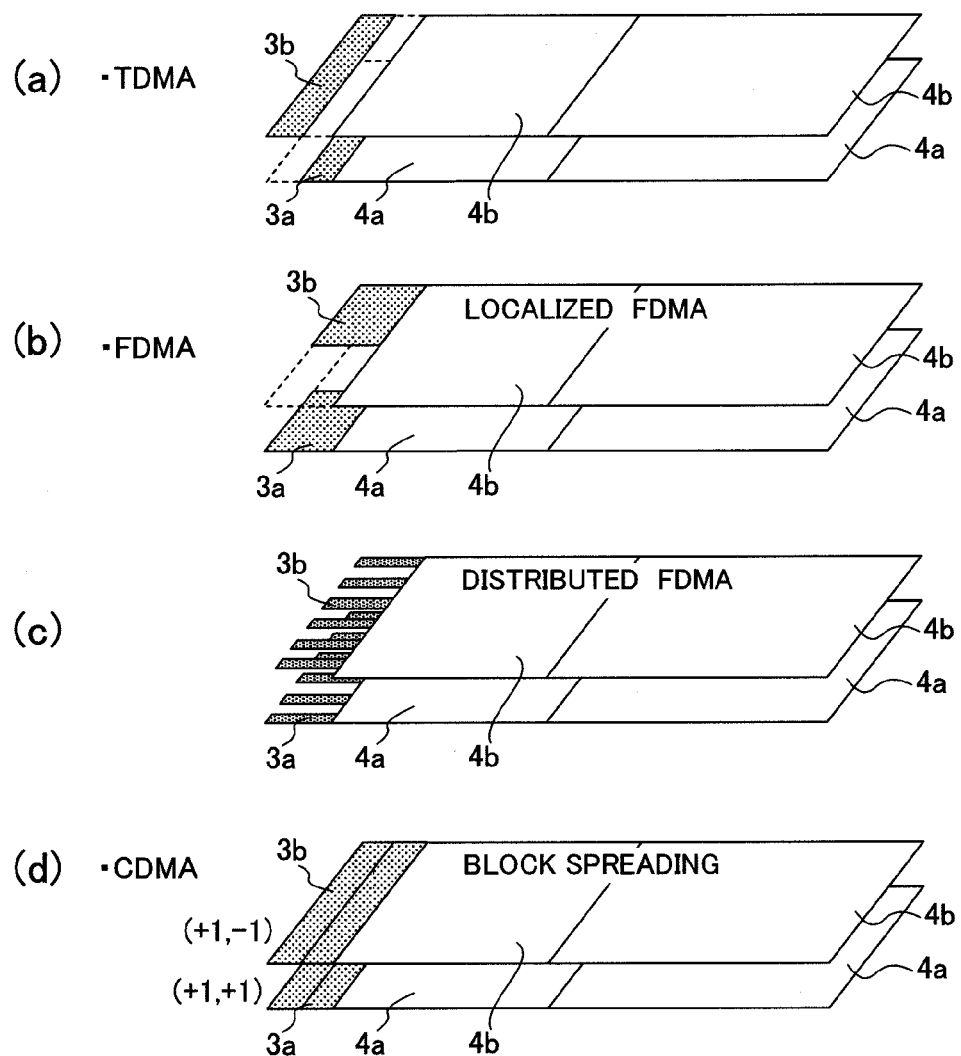
FIGS. 19(a) to 19(d) are diagrams to explain inter-user orthogonal multiplex in Embodiment 2 of the invention.

FIG. 18 is a diagram illustrating a multiplexing format of aspect MU5. In the case of transmitting the control signal 3 from two slots in a sub-frame, and multiplexing the control signal 3 and the data signal 4 by FDM, the control signal 3 may use radio resources spaced (discrete) from radio resources for transmitting the data signal 4. FIG. 18 illustrates the multiplexing formats received in a radio base station apparatus, and shows that the layer of a user #1

(Layer for UE#1) and the layer of a user #2 (Layer for UE#2) are transmitted in the same radio resources.

The multiplexing format as shown in FIG. 18 is a format for performing Frequency Division Multiplex on a signal corresponding to two slots comprised of control signal 3 and a signal corresponding to two slots comprised of data signal 4. In other words, as shown in FIG. 18, in an assignment band of the layer of the user #1, a signal of two slots where SC-FDMA symbols are of control signal 3a is assigned to a particular frequency band, and a signal of two slots where SC-FDMA symbols are of data signal 4a is assigned to another frequency band spaced from the frequency band assigned the control signal 3a. Further, in an assignment band of the layer of the user #2, a signal of two slots where SC-FDMA symbols are of control signal 3b is assigned to a particular frequency band, and a signal of two slots where SC-FDMA symbols are of data signal 4b is assigned to another frequency band spaced from the frequency band assigned the control signal 3b. In this aspect, as in the aspect SU7, the frequency band to assign the control signal may be changed for each slot to apply inter-slot frequency hopping.

In the above-mentioned aspects MU1 to MU5, radio resources to transmit the control signal are capable of being changed adaptively in consideration of the type of control signal to transmit, data size of the control signal, information of reception quality and the like.

Figure 20:
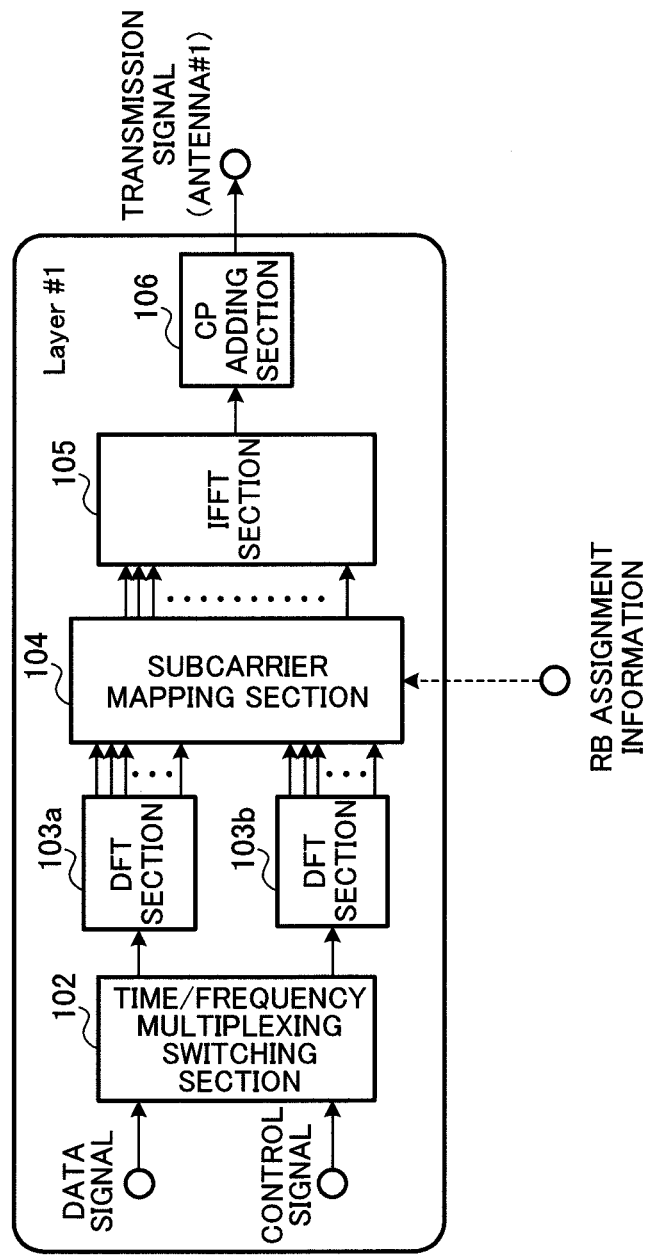
FIG. 20 is a block diagram illustrating part of a configuration of a mobile terminal apparatus according to Embodiment 2 of the invention.

FIG. 20 is a block diagram illustrating part of a configuration of the mobile terminal apparatus according to Embodiment 2 of the invention. In the mobile terminal apparatus as shown in FIG. 20, a transmission section thereof is mainly comprised of a time/frequency multiplexing switching section 102, DFT sections 103a, 103b, subcarrier mapping section 104, IFFT sections 105, and CP adding section 106.

The time/frequency multiplexing switching section 102 switches multiplexing schemes of the control signal and the data signal. In other words, in the case of time-multiplexing the data signal and the control signal, the time/frequency multiplexing switching section 102 outputs one of the data signal and the control signal to the DFT sections 103a, 103b, while outputting each of the data signal and the control signal to the DFT sections 103a, 103b in the case of frequency-multiplexing.

The subcarrier mapping section 104 maps signals in the frequency domain to subcarriers based on RB allocation information. In other words, in the case of frequency multiplexing, the subcarrier mapping section 104 separates the data signal and control signal subjected to DFT to assign to different radio resources. Further, as in the above-mentioned aspect MU3, the subcarrier mapping section 104 also has the function of assigning the data signal to the PUSCH, and assigning the control signal to the PUCCH. Furthermore, as in the above-mentioned aspects MU4 and MU5, the subcarrier mapping section 104 also has the assignment functions of inter-slot frequency hopping, Distributed FDMA, and the like.

The DFT sections 103a, 103b perform DFT on the data signal to transform into the signals in the frequency domain. The IFFT section 105 performs IFFT on the mapped signal to transform into the signal in the time domain. The CP adding section 106 adds a CP to the IFFT-processed signal.

In addition, the RB allocation information is notified from the radio base station apparatus as control information. The notification is performed by Higher Layer signaling via the PUSCH and/or L1/L2 signaling via the PUCCH.

Figure 21:
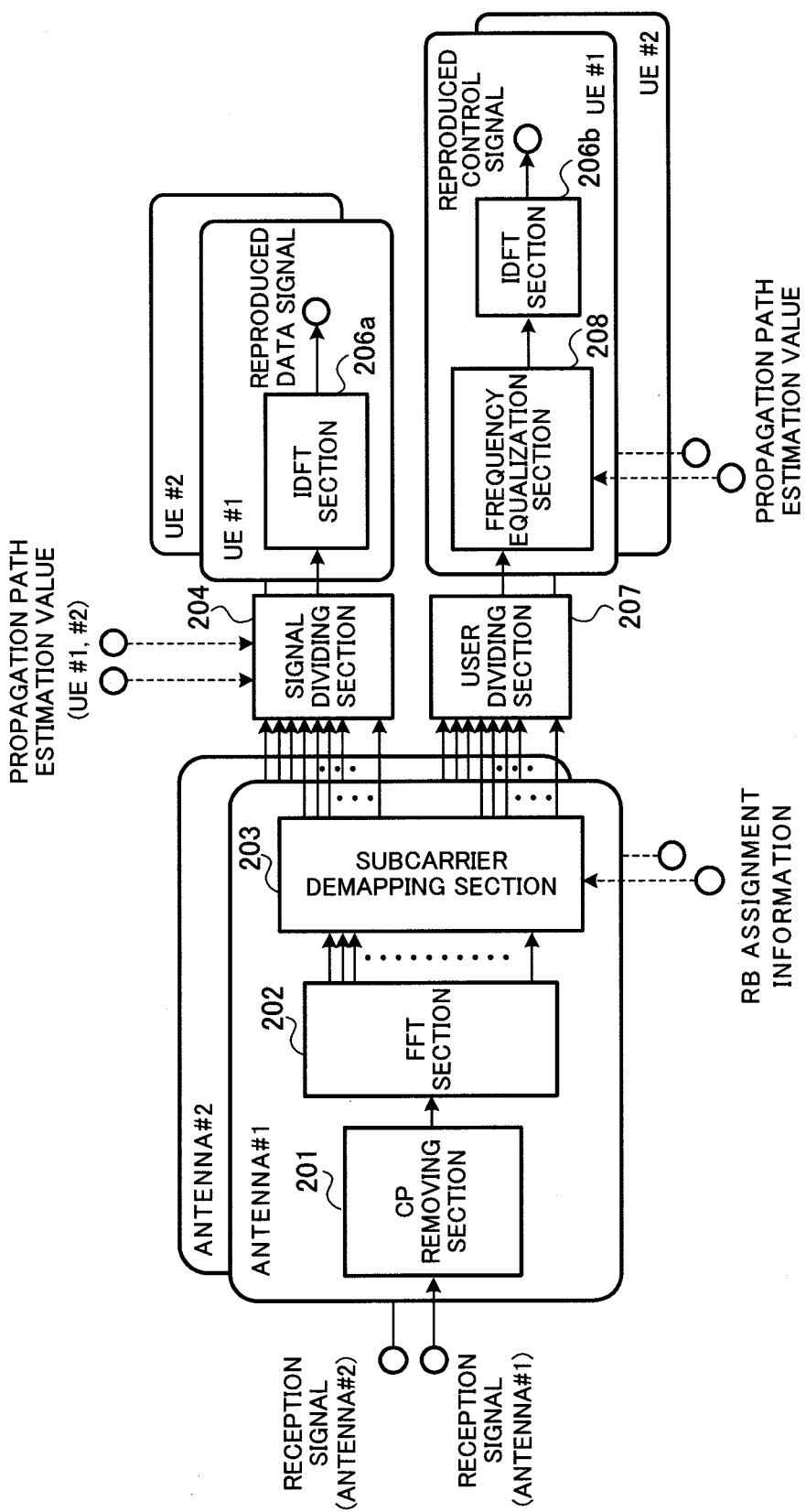
FIG. 21 is a block diagram illustrating part of a configuration of a radio base station apparatus according to Embodiment 2 of the invention.

FIG. 21 is a block diagram illustrating part of a confutation of the radio base station apparatus according to Embodiment 2 of the invention. The radio base station apparatus as shown in FIG. 21 is a radio base station apparatus capable of performing MIMO reception, and a reception section thereof is mainly comprised of CP removing sections 201, FFT sections 202, subcarrier demapping sections 203, signal dividing section 204, user dividing section 207, frequency equalization sections 208, and IDFT sections 206a, 206b. A reception processing section of each antenna has the CP removing section 201, FFT section 202, and subcarrier demapping section 203, and each of layer processing sections for each user has the IDFT sections 206a for the data signal and 206b and frequency equalization section 208.

The subcarrier demapping section 203 separates the control signal and the data signal (in time and/or in frequency) for each SC-FDMA symbol based on the RB allocation information. The radio base station apparatus already knows how the control signal and the data signal are multiplexed, and therefore, the processing block is capable of separating the control signal and the data signal.

The signal dividing section 204 divides the subcarrier-demapped signal into data signals for each transmission layer using a propagation path estimation value of each of the users (UE#1, UE#2). The propagation path estimation value is obtained from a CQI signal for each user extracted from the reception signal by synchronization detection/channel estimation. The data signal divided for each user is transformed into the signal in the time domain in the IDFT section 206a of the signal processing section (UE#1, UE#2) for each user, then demodulated, decoded, and is signal-reproduced as the data signal.

The frequency equalization section 208 performs propagation path compensation on the control signal received for each layer using the respective propagation path estimation value. The propagation path estimation value is obtained from the CQI signal for each user extracted from the reception signal by synchronization detection/channel estimation. The control signal subjected to propagation path compensation is transformed into the signal in the time domain in the IDFT section 206b, then demodulated, decoded, and is signal-reproduced.

The user dividing section 207 divides control signals subjected to inter-user orthogonalization in mobile terminal apparatuses for each users. In the user division, control signals subjected to inter-user orthogonalization by TDMA as shown in FIG. 19(a) are divided by TDMA, control signals subjected to inter-user orthogonalization by FDMA as shown in FIGS. 19(b) and 19(c) are divided by FDMA, and control signals subjected to inter-user orthogonalization by CDMA as shown in FIG. 19(d) are divided by CDMA.

The CP removing section 201 removes a portion corresponding to the CP and extracts an effective signal portion, using an estimation value of reception timing estimated from the reception signal. The FFT section 202 performs FFT on the reception signal to transform into the signals in the frequency domain. The IDFT sections 206a 206b transform the signals in the frequency domain into the signals in the time domain.

A radio communication method according to this Embodiment using the radio base station apparatus and mobile terminal apparatus with the above-mentioned configurations will be described.

In the mobile terminal apparatus, the time/frequency multiplexing switching section 102 switches the multiplexing schemes of the control signal and the data signal. In the case (TDM) of using the multiplexing formats as shown in FIGS. 14(a), 15(a) and 17(c), the section 102 switches to output only one of the data signal and the control signal to the DFT sections 103a, 103b. Meanwhile, in the case (FDM) of using the multiplexing formats as shown in FIGS. 14(b), 15(b), 16, 17(a) and 18, the section 102 switches to output each of the data signal and the control signal to the DFT sections 103a, 103b. Further, in the case (FDM/TDM Hybrid) of using the multiplexing formats as shown in FIGS. 14(c), 15(c) and 17(b), the section 102 switches to output only one of the data signal and the control signal to the DFT sections 103a, 103b in the portion of TDM, while switching to output each of the data signal and the control signal to the DFT sections 103a, 103b in the portion of FDM.

The data signal and control signal from the time/frequency multiplexing switching section 102 are transformed into the signals in the frequency domain in the DFT sections 103a, 103b, and the signals are mapped to the multiplexing format of one of FIGS. 14(a) to 14(c), FIGS. 15(a) to 15(c), FIG. 16(a), FIGS. 17(a) to 17(c) and FIG. 18 in the subcarrier mapping section 104. Thus mapped signals are transformed into the signal in the time domain in the IFFT section 105, and then, a CP is added to the signal in the CP adding section 106.

In the case of the aspect (aspect in which the control signal is not transmitted in MIMO transmission) as shown in FIG. 16(b), only the data signal is transformed into the signals in the frequency domain in the DFT section, and the signals are mapped to the multiplexing format of FIG. 16(b) in the subcarrier mapping section. The mapping is performed based on the RB allocation information. Thus mapped signal is transformed into the signal in the time domain in the IFFT section, and a CP is added to the signal in the CP adding section. Thus processed signal is transmitted as an uplink signal. Such an uplink signal is MIMO-transmitted with the same radio resources in different transmission layers.

In the radio base station apparatus, the signal processing sections for each antenna receive MIMO-transmitted signals, the CP removing section 201 removes the CP, and then, the signal is transformed into the signals in the frequency domain in the FFT section 202. The signals in the frequency domain are demapped from the multiplexing format of one of FIGS. 14(a) to 14(c), FIGS. 15(a) to 15(c), FIGS. 16(a) and 16(b), FIGS. 17(a) to 17(c) and FIG. 18 in the subcarrier demapping section 203. The demapping is performed based on the RB allocation information.

The data signal subjected to subcarrier demapping from the processing section of each antenna is divided into data signals for each layer in the signal dividing section 204. The data signal divided for each layer is transformed into the signal in the time domain in the IDFT section 206a in the signal processing section for each user, then demodulated, decoded, and is signal-reproduced as the data signal. Meanwhile, the control signal subjected to subcarrier demapping from the processing section of each antenna is divided into control signals for each user in the user dividing section 207. The control signal divided for each user is subjected to propagation path compensation in the frequency equalization section 208 of the signal processing section for each user, transformed into the signal in the time domain in the IDFT section 206b, then demodulated, decoded, and is signal-reproduced as the control signal.

Thus, in the radio communication method according to this Embodiment, since the data signal and the control signal are not caused to coexist in one SC-FDMA symbol, and are time-multiplexed on an SC-FDMA symbol basis (basis of performing FFT), it is possible to eliminate interference from the data signal. Therefore, by separating the data signal and the control signal to assign to different radio resources, it is possible to receive the control signal with high quality and high efficiency in the case of using spatial multiplexing transmission in the data signal to transmit, and also transmitting the control signal in the same sub-frame.

Without departing from the scope of the invention, the number of processing sections and processing procedures in the above-mentioned description are capable of being carried into practice with modifications thereof as appropriate. Further, each element shown in the figures represents the function, and each function block may be actualized by hardware or may be actualized by software. Moreover, the invention is capable of being carried into practice with modifications thereof without departing from the scope of the invention.

The present application is based on Japanese Patent Application No. 2009-148999 filed on Jun. 23, 2009, entire content of which is expressly incorporated by reference herein.

The invention claimed is:

1. A mobile terminal apparatus comprising:
 a downlink signal receiver that receives a downlink signal including precoding information for uplink transmission;
 an assigning circuit that separates an uplink data signal and a control signal to assign to different radio resources of a PUSCH; and
 a transmitter that Multiple-Input Multiple-Output (MIMO)-transmits signals of respective uplink transmission layers based on the precoding information for uplink transmission,
 wherein the transmitter transmits control signals to be transmitted on PUSCHs of the respective uplink transmission layers, and
 wherein the control signals of the respective uplink transmission layers are the same signal.

2. The mobile terminal apparatus according to claim 1, wherein the uplink data signal and the control signal are time-multiplexed.

3. The mobile terminal apparatus according to claim 1, further comprising:
 a switching circuit that switches to output the control signal to the transmission layers.

4. A radio base station apparatus comprising:
 an uplink signal receiver that receives an uplink signal including an uplink data signal and a control signal assigned to different radio resources of a PUSCH and subjected to Multiple-Input Multiple-Output (MIMO) transmission;
 a signal dividing circuit that divides the uplink signal into data signals for respective uplink transmission layers;
 a signal reproducing circuit that reproduces the control signal from the uplink signal; and
 a transmitter that transmits a downlink signal including precoding information for uplink transmission,
 wherein the uplink signal receiver receives control signals on PUSCHs of the respective uplink transmission layers as the same control signals.

5. A radio base station apparatus comprising:
 an uplink signal receiver that receives an uplink signal including an uplink data signal and a control signal assigned to different radio resources of a PUSCH and subjected to Multiple-Input Multiple-Output (MIMO) transmission;
 a signal dividing circuit that divides the uplink signal into data signals for respective transmission layers; and
 a signal reproducing circuit that reproduces the control signal from the uplink signal, wherein the control signal is a signal obtained by subjecting control signals from a plurality of mobile terminal apparatuses to inter-user orthogonal multiplex, and the radio base station apparatus further comprises a user dividing circuit that inter-user divides the multiplexed control signal.

6. The radio base station apparatus according to claim 5, wherein the inter-user orthogonal multiplex is orthogonal multiplex by Time Division Multiple Access (TDMA), Frequency Division Multiple Access (FDMA) and/or Code Division Multiple Access (CDMA).

7. A radio communication method comprising:
in a mobile terminal apparatus,
receiving a downlink signal including precoding information;
separating an uplink data signal and a control signal to assign to different radio resources of a PUSCH; and
performing Multiple-Input Multiple-Output (MIMO) transmission on signals of respective uplink transmission layers based on the precoding information for uplink transmission; and
in a radio base station apparatus,
receiving an uplink signal including the uplink data signal and the control signal subjected to the MIMO transmission;
dividing the uplink signal into data signals for the respective uplink transmission layers; and
reproducing the control signal from the uplink signal,
wherein the mobile terminal apparatus transmits control signals to be transmitted on PUSCHs of the respective uplink transmission layers as the same control signals.

8. A radio communication method comprising:
in a mobile terminal apparatus,
receiving a downlink signal including precoding information for uplink transmission;
separating an uplink data signal and a control signal to assign to different radio resources of a PUSCH; and
performing Multiple-Input Multiple-Output (MIMO) transmission on signals of respective transmission layers based on the precoding information; and
in a radio base station apparatus,
receiving an uplink signal including the uplink data signal and the control signal subjected to the MIMO transmission;
dividing the uplink signal into data signals for the respective transmission layers; and
reproducing the control signal from the uplink signal,
wherein the control signal is a signal obtained by subjecting control signals from a plurality of mobile terminal apparatuses to inter-user orthogonal multiplex, and the radio communication method further comprises inter-user-dividing the multiplexed control signal.

9. The radio communication method according to claim 8, wherein the inter-user orthogonal multiplex is orthogonal multiplex by Time Division Multiple Access (TDMA), Frequency Division Multiple Access (FDMA) and/or Code Division Multiple Access (CDMA).

10. A radio communication system comprising:
a mobile terminal apparatus having:
a downlink signal receiver that receives a downlink signal including precoding information for uplink transmission;
an assigning circuit that separates an uplink data signal and a control signal to assign to different radio resources of a PUSCH; and
a transmitter that Multiple-Input Multiple-Output (MIMO)-transmits signals of respective uplink transmission layers based on the precoding information for uplink transmission; and
a radio base station apparatus having:
an uplink signal receiver that receives an uplink signal including the uplink data signal and the control signal subjected to MIMO transmission;
a signal dividing circuit that divides the uplink signal into data signals for the respective uplink transmission layers; and
a signal reproducing circuit that reproduces the control signal from the uplink signal,
wherein control signals to be transmitted on PUSCHs of the respective uplink transmission layers are transmitted as the same control signals.

* * * * *